United States Patent
Papasakellariou

(10) Patent No.: US 10,608,856 B2
(45) Date of Patent: Mar. 31, 2020

(54) TRANSMISSION OF REFERENCE SIGNALS IN A COMMUNICATION SYSTEM

(71) Applicant: Samsung Electronics Co., Ltd, Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/621,705

(22) Filed: Jun. 13, 2017

(65) Prior Publication Data
US 2017/0366377 A1 Dec. 21, 2017

Related U.S. Application Data

(60) Provisional application No. 62/350,861, filed on Jun. 16, 2016, provisional application No. 62/358,234, (Continued)

(51) Int. Cl.
*H04L 27/26* (2006.01)
*H04L 5/00* (2006.01)
(Continued)

(52) U.S. Cl.
CPC .......... *H04L 27/261* (2013.01); *H04L 1/0026* (2013.01); *H04L 5/003* (2013.01);
(Continued)

(58) Field of Classification Search
CPC ..... H04W 24/10; H04W 52/38; H04W 52/54; H04W 48/12; H04L 1/0026; H04L 5/0057;
(Continued)

(56) References Cited

U.S. PATENT DOCUMENTS

2011/0019637 A1  1/2011  Ojala et al.
2011/0299484 A1* 12/2011  Nam ...................... H04L 1/0025
                                                370/329
(Continued)

FOREIGN PATENT DOCUMENTS

EP   2985927 A1   2/2016
WO   2014019169 A1   2/2014

OTHER PUBLICATIONS

3GPP TS 36.211 V13.2.0 (Jun. 2016) Technical Specification 3rd Generation Partnership Project;Technical Specification Group Radio Access Network; Evolved Universal Terrestrial Radio Access (E-UTRA); Physical channels and modulation(Release 13)—Jun. 2016—168 Pages.

(Continued)

*Primary Examiner* — Hoang-Chuong Q Vu

(57) ABSTRACT

A method for a user equipment (UE) to transmit a channel state information (CSI) report. The method comprises receiving configuration information for a location of a CSI report trigger field in a downlink control information (DCI) format that includes multiple CSI report trigger fields and receiving the DCI format. The method further comprises determining whether or not a value for the CSI report trigger field indicates a transmission of a CSI report and transmitting a physical uplink control channel (PUCCH) that includes the CSI report when the value indicates a transmission of the CSI report.

21 Claims, 23 Drawing Sheets

Related U.S. Application Data filed on Jul. 5, 2016, provisional application No. 62/364,443, filed on Jul. 20, 2016, provisional application No. 62/364,452, filed on Jul. 20, 2016.

(51) Int. Cl.
  *H04L 1/00* (2006.01)
  *H04W 24/00* (2009.01)
  *H04W 72/04* (2009.01)

(52) U.S. Cl.
  CPC ............ *H04L 5/005* (2013.01); *H04L 5/0053* (2013.01); *H04L 5/0057* (2013.01); *H04L 5/0092* (2013.01); *H04L 27/2613* (2013.01); *H04L 1/0028* (2013.01); *H04L 5/0048* (2013.01); *H04L 5/0051* (2013.01); *H04L 27/2601* (2013.01); *H04W 24/00* (2013.01); *H04W 72/042* (2013.01)

(58) Field of Classification Search
  CPC ............... H04L 27/2601; H04L 27/261; H04L 27/2613; H04L 5/0048; H04L 5/003
  See application file for complete search history.

(56) References Cited

U.S. PATENT DOCUMENTS

| | | | |
|---|---|---|---|
| 2011/0305161 A1 | 12/2011 | Ekpenyong et al. | |
| 2012/0147831 A1* | 6/2012 | Golitschek | H04L 1/0026 370/329 |
| 2013/0077596 A1* | 3/2013 | Liang | H04L 1/0031 370/329 |
| 2013/0117622 A1* | 5/2013 | Blankenship | H03M 13/136 714/751 |
| 2013/0324140 A1* | 12/2013 | Kwon | H04B 7/0626 455/450 |
| 2014/0010126 A1 | 1/2014 | Sayana et al. | |
| 2015/0201382 A1 | 7/2015 | Wang et al. | |
| 2015/0222400 A1 | 8/2015 | Xiong et al. | |
| 2015/0319633 A1 | 11/2015 | Ji et al. | |
| 2016/0037548 A1* | 2/2016 | Yan | H04W 72/1226 370/329 |
| 2016/0142191 A1* | 5/2016 | Davydov | H04L 1/0026 370/329 |
| 2016/0212733 A1* | 7/2016 | Davydov | H04B 7/0626 |
| 2016/0227530 A1* | 8/2016 | Davydov | H04L 5/0007 |
| 2016/0323912 A1* | 11/2016 | Nakamura | H04L 1/0026 |
| 2016/0338041 A1* | 11/2016 | Li | H04L 5/0055 |
| 2017/0019894 A1* | 1/2017 | Nimbalker | H04L 5/0053 |
| 2017/0041123 A1* | 2/2017 | Yang | H04J 11/00 |
| 2017/0048740 A1* | 2/2017 | Yang | H04B 7/26 |
| 2017/0170940 A1* | 6/2017 | Lee | H04L 5/0048 |
| 2017/0279583 A1* | 9/2017 | Dinan | H04W 72/042 |
| 2017/0310447 A1* | 10/2017 | Kusashima | H04J 11/00 |
| 2017/0325258 A1* | 11/2017 | Nogami | H04J 11/00 |
| 2017/0373741 A1* | 12/2017 | Yang | H04L 1/18 |
| 2018/0007731 A1* | 1/2018 | Park | H04W 76/20 |
| 2018/0020430 A1* | 1/2018 | Aiba | H04W 24/10 |
| 2018/0063736 A1* | 3/2018 | Sadeghi | H04W 72/0446 |
| 2018/0076924 A1* | 3/2018 | Lee | H04L 1/0026 |
| 2018/0083684 A1* | 3/2018 | He | H04B 7/0626 |
| 2018/0175983 A1* | 6/2018 | Yum | H04L 1/00 |
| 2018/0220413 A1* | 8/2018 | Yang | H04W 72/0413 |

OTHER PUBLICATIONS

3GPP TS 36.212 V13.2.0 (Jun. 2016) Technical Specification 3rd Generation Partnership Project;Technical Specification Group Radio Access Network; Evolved Universal Terrestrial Radio Access (E-UTRA); Multiplexing and channel coding(Release 13) Jun. 2016—140 Pages.

3GPP TS 36.213 V13.2.0 (Jun. 2016) Technical Specification 3rd Generation Partnership Project;Technical Specification Group Radio Access Network; Evolved Universal Terrestrial Radio Access (E-UTRA); Physical layer procedures(Release 13)—381 Pages.

3GPP TS 36.321 V13.2.0 (Jun. 2016) Technical Specification 3rd Generation Partnership Project;Technical Specification Group Radio Access Network; Evolved Universal Terrestrial Radio Access (E-UTRA); Medium Access Control (MAC) protocol specification (Release 13) Jun. 2016—91 Pages.

3GPP TS 36.331 V13.2.0 (Jun. 2016) Technical Specification 3rd Generation Partnership Project;Technical Specification Group Radio Access Network; Evolved Universal Terrestrial Radio Access (E-UTRA); Radio Resource Control (RRC);Protocol specification(Release 13)—Jun. 2016—623 Pages.

ISA/KR, "International Search Report," International Application No. PCT/KR2017/006316, dated Sep. 20, 2017, 3 pages.

European Patent Office, "Supplementary European Search Report," Application No. EP17813628.9, dated May 9, 2019, 9 pages.

"6 Random access procedure," R1-161550, 3GPP Draft, Release 13, 3GPP TS 36.213 V13.0.1 (Jan. 2016), 3rd Generation Partnership Project (3GPP), Mobile Competence Centre, Jan. 2016, 204 pages.

* cited by examiner

TRANSMISSION OF REFERENCE SIGNALS IN A COMMUNICATION SYSTEM

CROSS-REFERENCE TO RELATED APPLICATIONS AND CLAIM OF PRIORITY

The present application claims priority to U.S. Provisional Patent Application Ser. No. 62/350,861, filed on Jun. 16, 2016, entitled "Link Adaptation in a Communication System," U.S. Provisional Patent Application Ser. No. 62/358,234, filed on Jul. 5, 2016, entitled "Adaptation of Reference Signals in a Communication System," U.S. Provisional Patent Application Ser. No. 62/364,443, filed on Jul. 20, 2016, entitled "Link Adaptation in a Communication System," and U.S. Provisional Patent Application Ser. No. 62/364,452, filed on Jul. 20, 2016, entitled "Adaptation of Reference Signals in a Communication System," The content of the above-identified patent document is incorporated herein by reference.

TECHNICAL FIELD

The present application relates generally to a wireless communication system. More specifically, this disclosure relates to supporting link adaptation and overhead reduction for transmissions of reference signals between a base station and user equipments.

BACKGROUND

A user equipment (UE) is commonly referred to as a terminal or a mobile station, can be fixed or mobile, and can be a cellular phone, a personal computer device, or an automated device. A gNB is generally a fixed station and can also be referred to as a base station, an access point, or other equivalent terminology. A communication system includes a downlink (DL) that refers to transmissions from a base station or one or more transmission points to UEs and an uplink (UL) that refers to transmissions from UEs to a base station or to one or more reception points.

SUMMARY

The present disclosure relates to a pre-$5^{th}$-generation (5G) or 5G communication system to be provided for supporting higher data rates beyond $4^{th}$-generation (4G) communication system such as long term evolution (LTE). The present disclosure relates to dynamically configuring transmissions of channel state information reference signals to a group of UEs. The disclosure also relates to dynamically triggering a channel state information reports from a group of UEs. The disclosure additionally relates to dynamically configuring sounding reference signals transmissions from a group of UEs. The disclosure further relates to multiplexing in frequency transmissions of different reference signals from a base station or from UEs. The disclosure also relates to triggering a sounding reference signal transmission from a UE during a random access procedure from the UE. The disclosure additionally relates to adapting a density of a demodulation reference signal according to an operating scenario for transmission of data or control information. The disclosure further relates to supporting cross-link interference suppression or cancellation in time division duplex systems with different transmission directions among interfering gNBs.

In one embodiment, a UE is provided. The UE comprises a transceiver configured to receive configuration information for a location of a channel state information (CSI) report trigger field in a downlink control information (DCI) format that includes multiple CSI report trigger fields, and receive the DCI format. The UE further comprises a controller configured to determine whether or not a value for the CSI report trigger field indicates a transmission of a CSI report, wherein the transceiver is further configured to transmit a physical uplink control channel (PUCCH) that includes the CSI report when the value indicates a transmission of the CSI report.

In another embodiment, a base station is provided. The base statin comprises a transceiver configured to transmit configuration information for a location of a CSI report trigger field in a DCI format that includes multiple CSI report trigger fields, and the DCI format. The base station further comprises the transceiver configured to receive a PUCCH that includes a CSI report when a value for the CSI trigger field indicates a transmission of the CSI report.

In yet another embodiment, a method for a UE to transmit a CSI report is provided. The method comprises receiving configuration information for a location of a CSI report trigger field in a DCI format that includes multiple CSI report trigger fields; receiving the DCI format, determining whether or not a value for the CSI report trigger field indicates a transmission of a CSI report, and transmitting a PUCCH that includes the CSI report when the value indicates a transmission of the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, both frequency division duplexing (FDD) and time division duplexing (TDD) are considered as the duplex method for DL and UL signaling.

Although exemplary descriptions and embodiments to follow assume orthogonal frequency division multiplexing (OFDM) or orthogonal frequency division multiple access (OFDMA), this present disclosure can be extended to other OFDM-based transmission waveforms or multiple access schemes such as filtered OFDM (F-OFDM) or OFDM with zero cyclic prefix.

This present disclosure covers several components which can be used in conjunction or in combination with one another, or can operate as standalone schemes

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 26, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation" (REF1); 3GPP TS 36.212 v13.2.0, "E-UTRA, Multiplexing and Channel coding" (REF2); 3GPP TS 36.213 v13.2.0, "E-UTRA, Physical Layer Procedures" (REF3); 3GPP TS 36.321 v13.2.0, "E-UTRA, Medium Access Control (MAC) protocol specification;" (REF4) and 3GPP TS 36.331 v13.2.0, "E-UTRA, Radio Resource Control (RRC) Protocol Specification" (REF5).

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
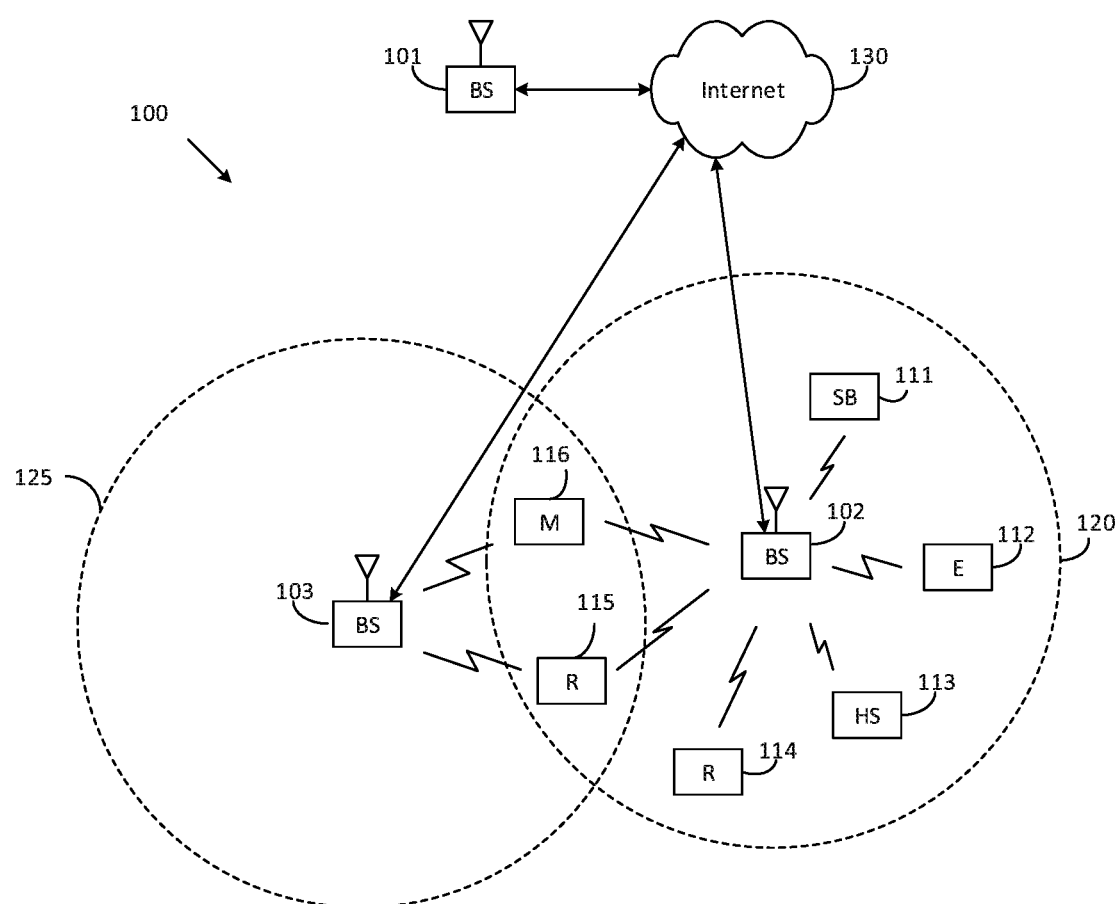
FIG. 1 illustrates an example wireless network according to embodiments of the present disclosure.
Figure 2:
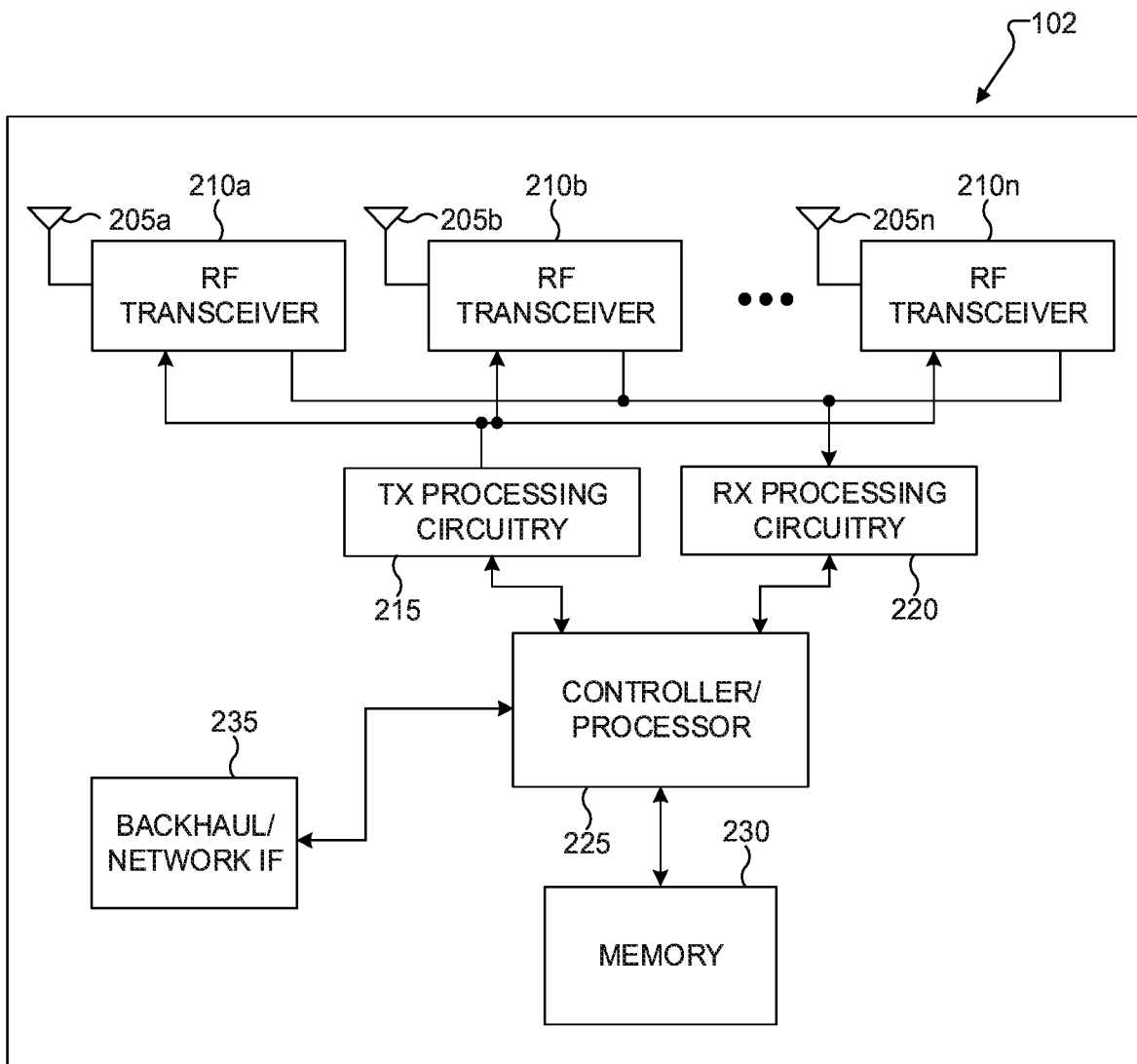
FIG. 2 illustrates an example gNB according to embodiments of the present disclosure.
Figure 3:
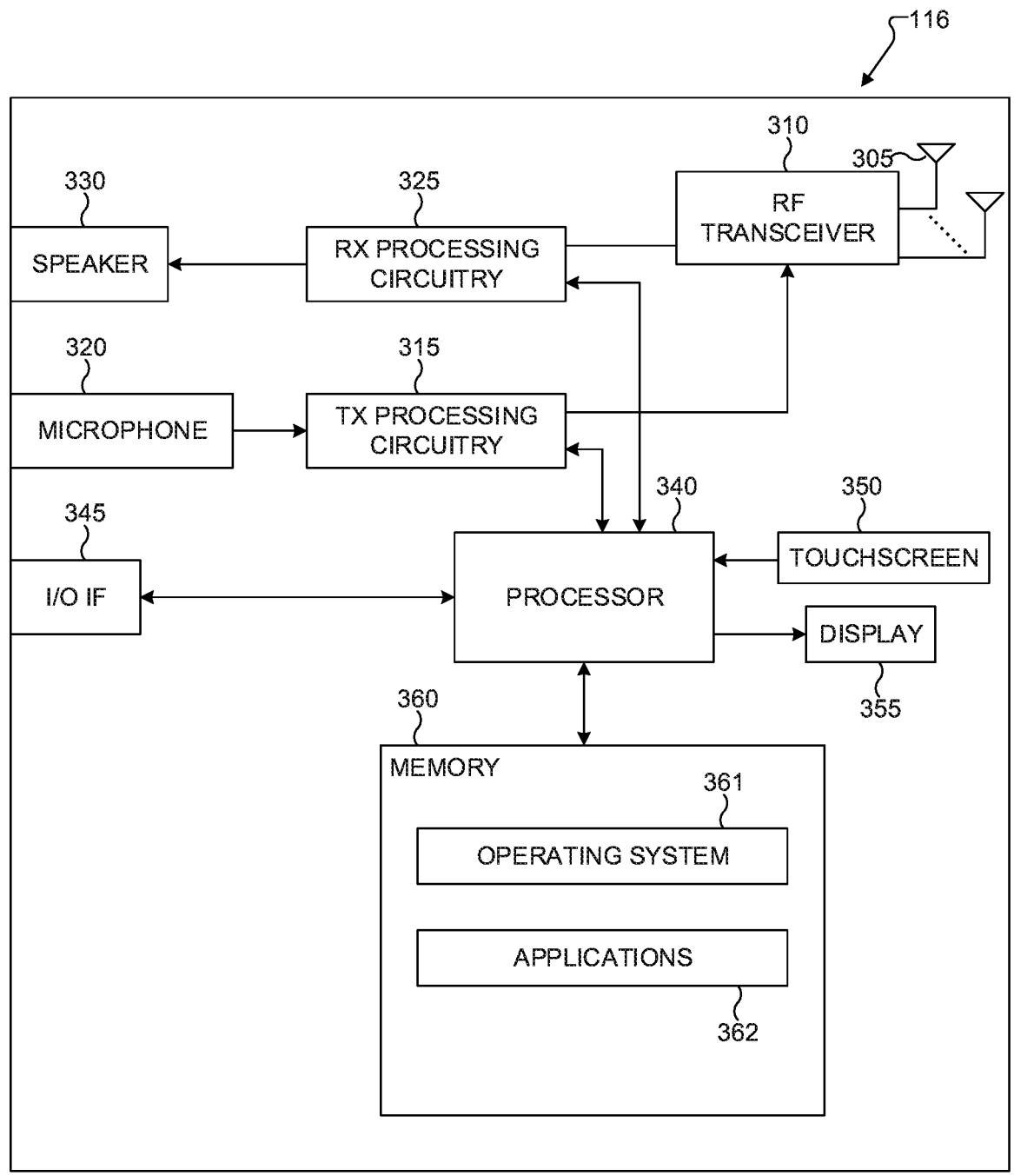
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), gNB, a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "eNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses a gNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for efficient CSI reporting on an uplink channel in an advanced wireless communication system. In certain embodiments, and one or more of the gNBs 101-103 includes circuitry, programming, or a combination thereof, for receiving efficient CSI reporting on an uplink channel in an advanced wireless communication system.

Although FIG. 1 illustrates one example of a wireless network 100, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting configuration information for a location of a CSI report trigger field in a DCI format that includes multiple CSI report trigger fields, and the DCI format and receiving a PUCCH that includes the CSI report when a value for the CSI report trigger field indicates a transmission of the CSI report.

In some embodiments, the RF transceivers 210a-210n are capable of transmitting configuration information for a PUCCH resource field, a resource for the PUCCH reception being determined based on a value of the PUCCH resource field and a number of values of CSI report trigger fields, with respective locations prior to the location, that indicate receptions of respective CSI reports.

In such embodiments, the DCI format includes a transmission power control (TPC) command field.

In such embodiments, the DCI format indicates a transmission of a channel state information reference signal (CSI-RS).

In such embodiments, the PUCCH reception includes a reception of a demodulation reference signal (DMRS) and a DMRS structure is determined based on a coding rate of the CSI report.

In such embodiments, a PUCCH reception includes a reception of a first demodulation reference signal (DMRS) and a second DMRS that is frequency division multiplexed with the first DMRS over a common bandwidth on a same reception symbol.

In some embodiments, the RF transceivers 210a-210n are capable of demodulating, using the second DMRS, a signal received on same sub-carriers as the CSI report.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

In some embodiments, the controller/processor 225 includes at least one microprocessor or microcontroller. As described in more detail below, the gNB 102 may include circuitry, programming, or a combination thereof for processing of an uplink channel and/or a downlink channel. For example, controller/processor 225 can be configured to execute one or more instructions, stored in memory 230, that are configured to cause the controller/processor to process the signal.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving configuration information for a location of a CSI report trigger field in a DCI format that includes multiple CSI report trigger fields and receiving the DCI format.

In some embodiments, the RF transceiver 310 is capable of transmitting a PUCCH that includes a CSI report when a value for the CSI report trigger field indicates a transmission of the CSI report.

In some embodiments, the RF transceiver 310 is capable of receiving configuration information for a PUCCH resource field, a resource for the PUCCH transmission being determined based on a value of the PUCCH resource field and a number of values of CSI report trigger fields, with respective locations prior to the location, that indicate transmissions of respective CSI reports.

In such embodiments, the DCI format includes a PUCCH resource field and a resource for the PUCCH transmission is determined based on a value of the PUCCH resource field and a number of values of CSI report trigger fields, with respective locations prior to the location, that indicate transmissions of respective CSI reports.

In such embodiments, the DCI format includes a transmission power control (TPC) command field and a PUCCH transmission power is determined according to a value of the TPC command field.

In such embodiments, the DCI format indicates a reception of a channel state information reference signal (CSI-RS) and the CSI report is determined based on the CSI-RS.

In such embodiments, a PUCCH transmission includes a transmission of a demodulation reference signal (DMRS) and a DMRS structure is determined based on a coding rate of the CSI report.

In such embodiments, a PUCCH transmission is performed over a number of slots and includes a transmission of a demodulation reference signal (DMRS) over a number of sub-carriers and a ratio of the number of sub-carriers over the number of slots is smaller when the number of slots is larger than one than when the number of slots is one.

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for reference signal on a downlink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

In some embodiments, the processor 340 is capable of determining whether or not a value for the CSI report trigger field indicates a transmission of a CSI report, wherein the transceiver is further configured to transmit a PUCCH that includes the CSI report when the value indicates a transmission of the CSI report.

In such embodiments, the DCI format includes a PUCCH resource field and a resource for the PUCCH transmission is determined based on a value of the PUCCH resource field and a number of values of CSI report trigger fields, with respective locations prior to the location, that indicate transmissions of respective CSI reports.

In such embodiments, the DCI format includes a transmission power control (TPC) command field and a PUCCH transmission power is determined according to a value of the TPC command field.

In such embodiments, the DCI format indicates a reception of a channel state information reference signal (CSI-RS) and the CSI report is determined based on the CSI-RS.

In such embodiments, a PUCCH transmission includes a transmission of a demodulation reference signal (DMRS) and a DMRS structure is determined based on a coding rate of the CSI report.

In such embodiments, the PUCCH transmission is performed over a number of slots and includes a transmission of a demodulation reference signal (DMRS) over a number of sub-carriers and a ratio of the number of sub-carriers over the number of slots is smaller when the number of slots is larger than one than when the number of slots is one.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
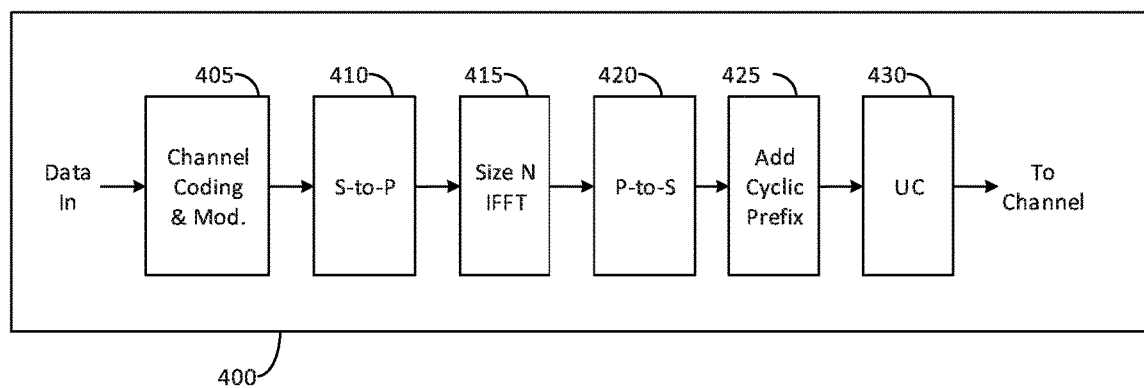
FIG. 4A illustrates a high-level diagram of an orthogonal frequency division multiple access transmit path according to embodiments of the present disclosure.
Figure 4B:
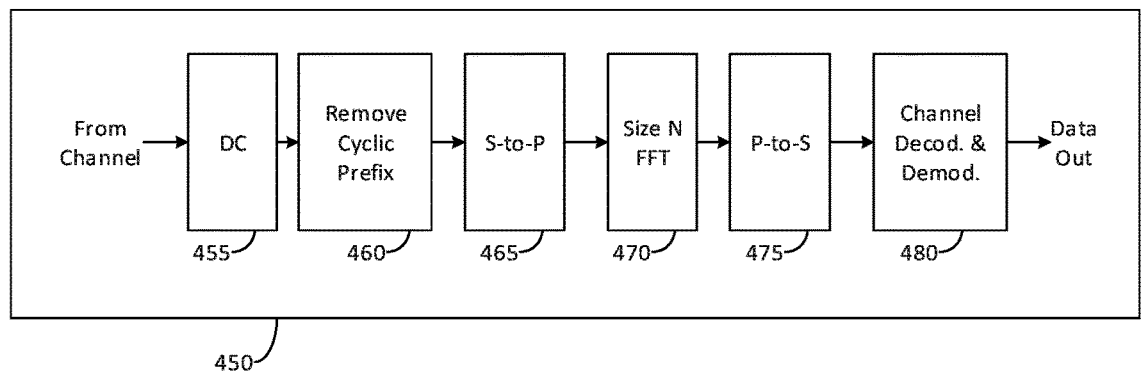
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (gNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. gNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size n fast Fourier transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of size N may be modified according to the implementation.

Furthermore, although this disclosure is directed to an embodiment that implements the fast Fourier transform and the inverse fast Fourier transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

DL transmissions or UL transmissions can be based on an orthogonal frequency division multiplexing (OFDM) waveform including a variant using DFT precoding that is known as DFT-spread-OFDM that is typically applicable to UL transmissions.

A reference time unit for DL signaling or for UL signaling on a cell is referred to as a slot and can include one or more slot symbols. A bandwidth (BW) unit is referred to as a resource block (RB). One RB includes a number of sub-carriers (SCs). For example, a slot can have duration of half millisecond or of one millisecond, include 7 symbols or 14 symbols, respectively, and a RB can have a BW of 180 KHz and include 12 SCs with inter-SC spacing of 15 KHz. A BW reception capability or a BW transmission for a UE can be smaller than a DL system BW or an UL system BW, respectively, and different UEs can be configured DL receptions or UL transmissions in different parts of a DL system BW or of an UL system BW, respectively, per slot.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A gNB transmits one or more of multiple types of RS including channel state information RS (CSI-RS) and demodulation RS (DMRS). A CSI-RS is intended for UEs to measure channel state information (CSI). A DMRS is typically transmitted only in the BW of a respective PDCCH or PDSCH and a UE can use the DMRS to demodulate DCI or data information. A DL DMRS or CSI-RS can be constructed by a Zadoff-Chu (ZC) sequence or a pseudo-noise (PN) sequence.

For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through higher layer signaling, such as radio resource control (RRC) signaling from a gNB. Transmission instances and resources of a CSI-RS can be indicated by DL control signaling or configured by higher layer signaling. A DMRS is transmitted only in the BW of a respective PDCCH or PDSCH and a UE can use the DMRS to demodulate data or control information.

Figure 5:
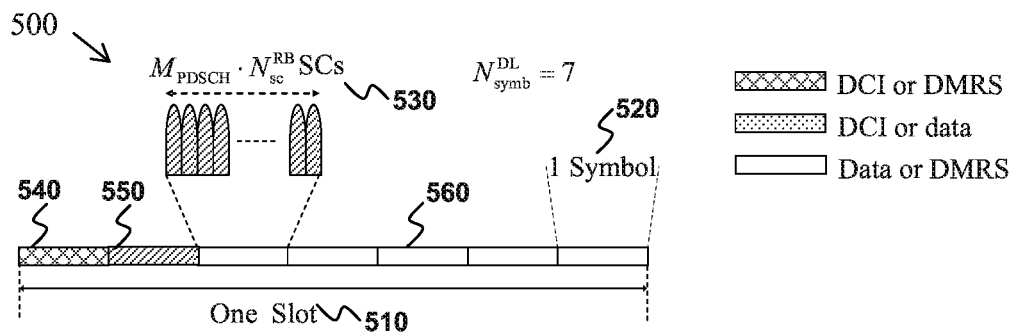
FIG. 5 illustrates an example DL slot structure for transmissions of DL channels or DL signals according to embodiments of the present disclosure.

FIG. 5 illustrates an example DL slot structure 500 for transmissions of DL channels or DL signals according to embodiments of the present disclosure. An embodiment of the DL slot structure 500 for transmissions of DL channels or DL signals shown in FIG. 5 is for illustration only. Other embodiments may be used without departing from the scope of the present disclosure.

A slot 510 includes $N^{DL}_{symb}=7$ symbols 520 where a gNB transmits data information, DCI, or DMRS. A DL system BW includes $N_{RB}^{DL}$ RBs. Each RB includes $NR_{sc}^{RB}$ SCs. For example, $N_{sc}^{RB}=12$. A UE is assigned $M_{PDSCH}$ RBs for a total of $M_{sc}^{PDSCH}=M_{PDSCH} \cdot N_{sc}^{RB}$ SCs 530 for a PDSCH transmission BW. A first slot symbol 540 can be used by the gNB to transmit DCI and DMRS. A second slot symbol 550 can be used by the gNB to transmit DCI, DMRS, or data information. Remaining slot symbols 560 can be used by the gNB to transmit data information, DMRS, and possibly CSI-RS. In some slots, the gNB can also transmit synchronization signals and system information.

CSI-RS can be transmitted on a number of antenna ports, such as one, two, four, eight, twelve, or sixteen antenna ports. For CSI-RS using more than eight antenna ports, $N_{res}^{CSI}>1$ CSI-RS configurations in a same slot are aggregated to obtain a total of $N_{res}^{CSI} N_{ports}^{CSI}$ antenna ports. Each CSI-RS configuration in such an aggregation corresponds to $N_{ports}^{CSI} \in \{4,8\}$ antenna ports. A mapping of a CSI-RS to REs in a slot.

Multiple CSI-RS configurations can be used in a cell. A UE can be configured with multiple sets of CSI-RS including up to three configurations for NZP CSI-RS the UE can use for CSI reporting and zero or more configurations for ZP CSI-RS. The NZP CSI-RS configurations are provided by higher layers. The ZP CSI-RS configurations in a slot can be given by a bitmap derived.

A UE can be configured with one or more CSI-RS resource configuration(s) that can include the following parameters: (1) CSI-RS resource configuration identity; (2) number of CSI-RS ports. For example, allowable values and antenna port mapping; (3) CSI-RS configuration; (4) UE assumption on reference PDSCH transmitted power for CSI feedback $P_c$ for each CSI process. When CSI slot sets $C_{CSI,0}$ and $C_{CSI,1}$ are configured by higher layers for a CSI process, $P_c$ is configured for each CSI slot set of the CSI process; (5) pseudo-random sequence generator parameter, $n_{ID}$; and (6) CDM type parameter, if UE is configured with higher layer parameter eMIMO-Type and eMIMO-Type is set to 'CLASS A' for a CSI process.

A UE can be configured with one or more CSI resource configuration(s) for interference measurement (CSI-IM). A UE is typically not expected to receive a CSI-IM resource configuration that is not completely overlapping with one of the ZP CSI-RS resource configurations.

UL signals also include data signals conveying data information, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH. UCI includes hybrid automatic repeat request acknowledgement (HARQ-ACK) information, indicating correct or incorrect detection of data transport blocks (TBs) for one or more PDSCH receptions, scheduling request (SR) indicating whether a UE has data in the UE's buffer, and CSI reports enabling a gNB to select appropriate parameters for PDSCH or PDCCH transmissions to a UE.

Figure 6:
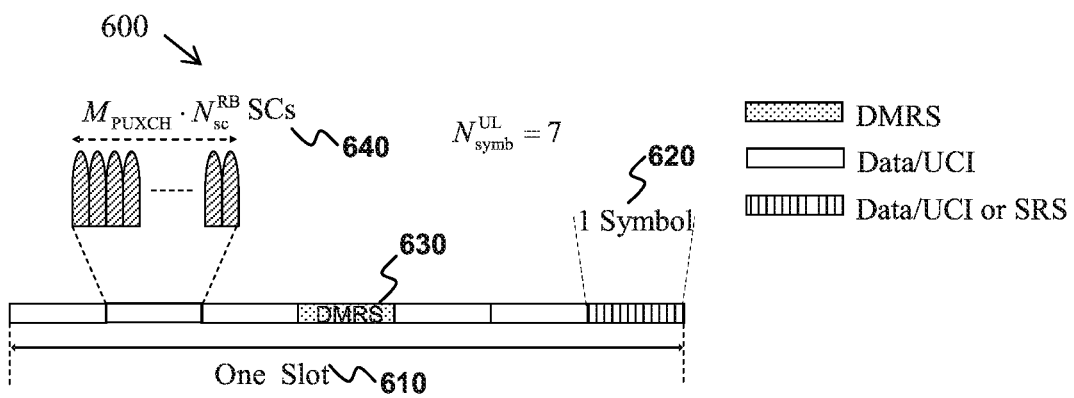
FIG. 6 illustrates an example UL slot structure for transmissions of UL channels or UL signals according to embodiments of the present disclosure.

FIG. 6 illustrates an example UL slot structure 600 for transmissions of UL channels or UL signals according to embodiments of the present disclosure. An embodiment of the UL slot structure 600 for transmissions of UL channels or UL signals shown in FIG. 6 is for illustration only. Other embodiments may be used without departing from the scope of the present disclosure.

A slot 610 includes $N_{symb}^{UL}=7$ symbols 620 where a UE transmits data information, UCI, or RS including at least one symbol where the UE transmits DMRS 630. An UL system BW includes $N_{RB}^{UL}$ RBs. Each RB includes NR SCs. A UE is assigned $M_{PUXCH}$ RBs for a total of $M_{sc}^{PUXCH}=M_{PUXCH} \cdot N_{sc}^{RB}$ SCs 640 for a PUSCH transmission BW ("X"="S") or for a PUCCH transmission BW ("X"="C"). One or more last slot symbols can be used to multiplex SRS transmissions 650 (or PUCCH transmissions) from one or more UEs. A number of UL slot symbols available for data/UCI/DMRS transmission is $N_{symb}^{PUXCH}=2 \cdot (N_{symb}^{UL}-1)-N_{SRS}$. $N_{SRS}>0$ when $N_{SRS}$ last slot symbols are used SRS transmissions (or PUCCH transmissions) from UEs that overlap at least partially in BW with a PUXCH transmission BW; otherwise, $N_{SRS}=0$. Therefore, a number of total SCs for a PUXCH transmission is $M_{sc}^{PUXCH} \cdot N_{symb}^{PUXCH}$.

A hybrid slot includes a DL transmission region, a guard period region, and an UL transmission region, similar to a special subframe in LTE. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions.

Figure 7:
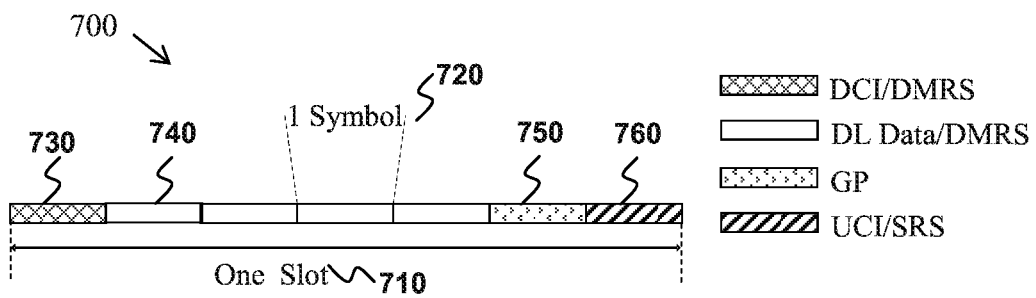
FIG. 7 illustrates an example hybrid slot structure for DL transmissions and UL transmissions according to embodiments of the present disclosure.

FIG. 7 illustrates an example hybrid slot structure 700 for DL transmissions and UL transmissions according to embodiments of the present disclosure. An embodiment of the hybrid slot structure 700 for the DL transmissions and UL transmissions shown in FIG. 7 is for illustration only. Other embodiments may be used without departing from the scope of the present disclosure.

A slot 710 consists of a number of symbols 720 that include a symbol for DCI transmissions and DMRS in respective PDCCHs 730, four symbols for data transmissions in respective PDSCHs 740, a gap period (GP) symbol 750 to provide a guard time for switching from DL transmission to UL transmission, and an UL symbol for transmitting UCI on a PUCCH 760. In general, any partitioning between DL symbols and UL symbols of a hybrid slot is possible by sliding the location of the GP symbol from the second symbol of a slot to the second to last symbol of the slot. The GP can also be shorter than one slot symbol and the additional time duration can be used for DL transmissions or for UL transmissions with larger SC spacing.

A CSI report from a UE can include a channel quality indicator (CQI) informing a gNB of a maximum modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and sounding RS (SRS). DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmissions. An UL DMRS or SRS can be constructed by a ZC sequence or a PN sequence. Additionally, in order to establish synchronization or an initial RRC connection with a gNB, a UE can transmit a random access channel.

For an UL DMRS or SRS transmission based on a ZC sequence over a BW of $N_{RB}^{max,UL}$ RBs, a sequence $r_{u,v}^{(\alpha)}(n)$ can be defined by a cyclic shift (CS) $\alpha$ of a base sequence $\bar{r}_{n,v}(n)$ according to $r_{u,v}^{(\alpha)}(n)=e^{j\alpha n}\bar{r}_{u,v}(n)$, $0 \leq n < M_{sc}^{RS}$, where $M_{sc}^{RB}=mN_{sc}^{RB}$ is a sequence length, $1 \leq m \leq N_{RB}^{max,UL}$, and $\bar{r}_{u,v}(n)=x_q(n \bmod N_{ZC}^{RS})$ where the $q^{th}$ root ZC sequence is defined by $$x_q(m) = \exp\left(\frac{-j\pi qm(m+1)}{N_{ZC}^{RS}}\right),$$

$0 < m \leq N-1$ with q given by $q=\lfloor \bar{q}+\frac{1}{2} \rfloor + v \cdot (-1)^{\lfloor 2\bar{q} \rfloor}$ and $\bar{q}$ given by $\bar{q}=N_{ZC}^{RS} \cdot (u+1)/31$. A length $N_{ZC}^{RS}$ of a ZC sequence is given by a largest prime number such that $N_{ZC}^{RS} < M_{sc}^{RS}$. Multiple RS sequences can be defined from a single base sequence using different values of $\alpha$. UL DMRS or SRS transmissions can have a comb spectrum where non-consecutive SCs are used for transmission in a slot symbol.

A UE can determine a PUSCH transmission power, or a PUCCH transmission power, or an SRS transmission power according to a respective power control process that includes an open-loop power control (OLPC) based on parameters configured to a UE by a gNB through higher layer signaling and a path-loss measured by the UE and a closed-loop power control (CLPC) based on transmission power control (TPC) commands provided to the UE from the gNB through a DCI format in a PDCCH. An objective of a power control process is to enable reception of a signal with a target signal to interference and noise ratio (SINR) while controlling inter-cell interference due to the signal transmission.

A UE typically monitors multiple candidate locations to decode respective potential PDCCH transmissions to decode multiple DCI formats in a slot. A DCI format includes cyclic redundancy check (CRC) bits in order for the UE to confirm a correct detection of the DCI format. A DCI format type is identified by a radio network temporary identifier (RNTI) that scrambles the CRC bits. For a DCI format scheduling a PDSCH or a PUSCH to a single UE, the RNTI can be a cell RNTI (C-RNTI) and serves as a UE identifier. For a DCI format scheduling a PDSCH conveying system information (SI), the RNTI can be an SI-RNTI. For a DCI format scheduling a PDSCH providing a random access response (RAR), the RNTI can be an RA-RNTI. For a DCI format providing TPC commands to a group of UEs, the RNTI can be a TPC-RNTI. Each RNTI type can be configured to a UE through higher-layer signaling such as RRC signaling. A DCI format scheduling PDSCH transmission to a UE is also referred to as DL DCI format or DL assignment while a DCI format scheduling PUSCH transmission from a UE is also referred to as UL DCI format or UL grant.

A gNB can configure a UE one or more sets of time/frequency (T/F) resources, referred to as DL control resource sets where each DL control resource set is defined by a set of RBs and slot symbols, for the UE to decode PDCCH transmissions. A configuration of T/F resources can be separate for each DL control resource set.

Figure 8:
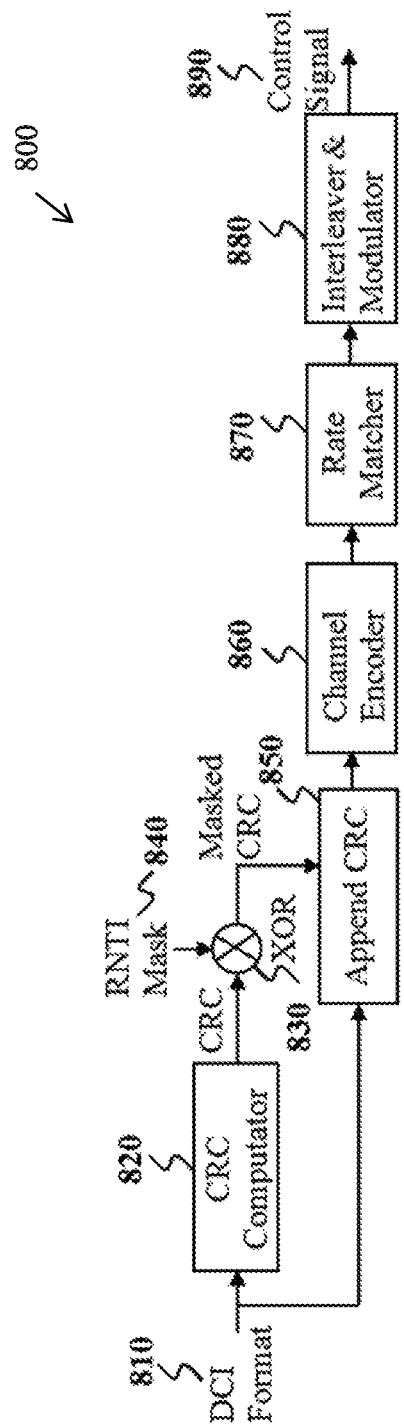
FIG. 8 illustrates an example encoding and transmission process for a DCI format according to embodiments of the present disclosure.

FIG. 8 illustrates an example encoding and transmission process 800 for DCI format according to embodiments of the present disclosure. An embodiment of the encoding and transmission process 800 for the DCI format shown in FIG. 8 is for illustration only. Other embodiments may be used without departing from the scope of the present disclosure.

A gNB separately encodes and transmits each DCI format in a respective PDCCH. When applicable, a RNTI for a UE that a DCI format is intended for masks a CRC of the DCI format codeword in order to enable the UE to identify the DCI format. For example, the CRC and the RNTI can include 16 bits. Otherwise, when a RNTI is not included in a DCI format, a DCI format type indicator field can be included in the DCI format. The CRC of (non-coded) DCI format bits 810 is determined using a CRC computation unit 820, and the CRC is masked using an exclusive OR (XOR) operation unit 830 between CRC bits and RNTI bits 840. The XOR operation is defined as XOR(0,0)=0, XOR(0,1)=1, XOR(1,0)=1, XOR(1,1)=0. The masked CRC bits are appended to DCI format information bits using a CRC append unit 850. An encoder 860 performs channel coding (such as tail-biting convolutional coding or polar coding), followed by rate matching to allocated resources by rate matcher 870. Interleaving and modulation units 880 apply interleaving and modulation, such as QPSK, and the output control signal 890 is transmitted.

Figure 9:
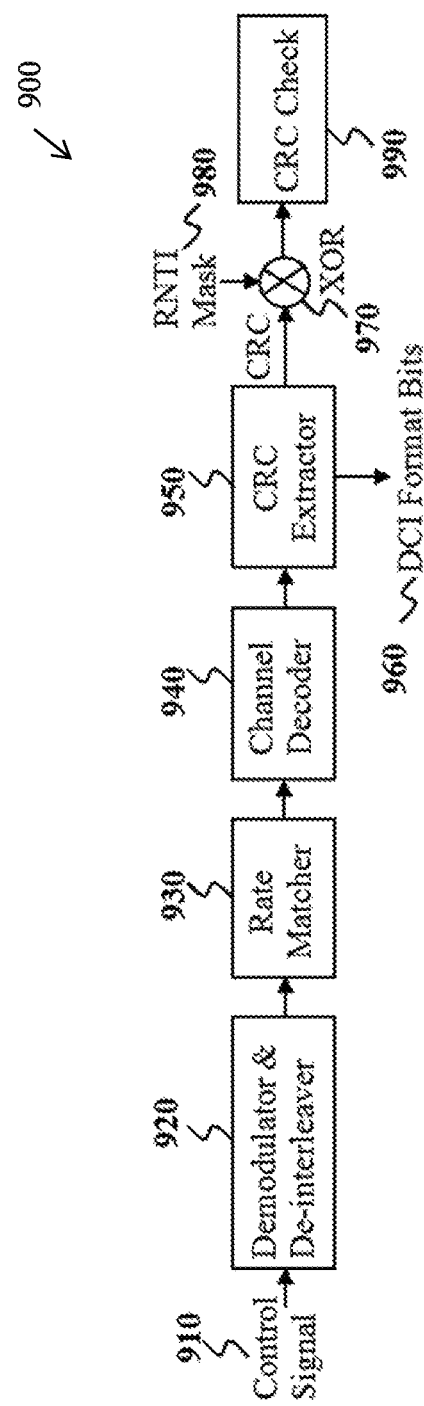
FIG. 9 illustrates an example reception and decoding process for a DCI format for use with a UE according to embodiments of the present disclosure.

FIG. 9 illustrates an example reception and decoding process 900 for a DCI format for use with a UE according to embodiments of the present disclosure. An embodiment of the decoding process 900 for the DCI format for use with the UE shown in FIG. 9 is for illustration only. Other embodiments may be used without departing from the scope of the present disclosure.

A received control signal 910 is demodulated and de-interleaved by a demodulator and a de-interleaver 920. A rate matching applied at a gNB transmitter is restored by rate matcher 930, and resulting bits are decoded by decoder 940. After decoding, a CRC extractor 950 extracts CRC bits and provides DCI format information bits 960. The DCI format information bits are de-masked 970 by an XOR operation with a RNTI 980 (when applicable) and a CRC check is performed by unit 990. When the CRC check succeeds (check-sum is zero), the DCI format information bits are considered to be valid. When the CRC check does not succeed, the DCI format information bits are considered to be invalid.

A PDCCH is transmitted using an aggregation of one or several consecutive control channel elements (CCEs). Each CCE includes a predetermined or configured number of resource element groups (REGs). A CCE-to-REG mapping can be frequency-first where a CCE is first mapped to REGs across RBs of a same symbol, or time-first where a CCE is mapped to REGs first across symbols of a DL control resource set. Unless explicitly noted otherwise, descriptions in the present disclosure assume time-first mapping.

A block of encoded and modulated symbols of a DCI format are mapped in sequence to resource elements (k,l), across SC index k and slot symbol l, on an associated antenna port that are part of the REGs assigned for the PDCCH transmission. For example, $l \in \{0, 1\}$. A PDCCH search space can be common to UEs or can be UE-specific when a UE is configured a C-RNTI equal to $n_{RNTI}$. For example, for the common search space $Y_k$ is set to 0 for two CCE aggregation levels L=4 and L=8, while for the UE-specific search space $S_k^{(L)}$ at CCE aggregation level L, $Y_k$ is defined by $Y_k = (A \cdot Y_{k-1}) \mod D$ where $Y_{-1} = n_{RNTI} \neq 0$, A=39827, D=65537 and k is a slot number.

One objective of 5G based systems is a minimization or elimination of periodically transmitted signals in order to enable a network to dynamically adapt a signaling direction (DL or UL) and avoid power consumption and interference from DL signaling or UL signaling when such signaling is not necessary. For example, an always present common RS (CRS) supported in systems using LTE radio access technology can be eliminated in a 5G-based system. Dynamic or periodic CSI-RS or SRS transmissions can be supported through control signaling indicating a presence and a time/frequency/code location of CSI-RS or SRS transmissions in a slot to a UE. The control signaling can be provided by higher layers or by the physical layer. However, UE-specific dynamic signaling is associated with disadvantages with the more important one being a need for a gNB to transmit multiple DCI formats to respective multiple UEs in order to inform of upcoming CSI-RS transmissions for the multiple UEs or to trigger SRS transmissions or CSI reports on PUCCHs from the multiple UEs. As DL control signaling represents system overhead and as resources for transmission of DL control signaling are limited, it is generally not possible to transmit a DCI format to each UE in a cell supported by a gNB in order to inform of an upcoming CSI-RS transmission or to trigger a PUCCH transmission for a CSI report or to trigger a SRS transmission. Moreover, a gNB scheduler cannot always schedule PDSCH transmission to every UE having data to receive prior to a CSI-RS transmission and it is beneficial for the gNB to have a CSI report from a UE prior to scheduling PDSCH transmissions to the UE. Similar observations apply for a SRS transmission.

Another objective of 5G systems is use of OFDM, instead of SC-FDMA, for UL transmissions. As a consequence, it is not necessary for a UE to transmit a same signal during a slot symbol to maintain a single-carrier property for the transmission and multiplexing of different signal types can be supported to potentially enable a more efficient utilization of available resources. Additionally, due to an absence of periodic SRS transmissions, a multiplexing capacity for SRS transmissions needs to increase. Further, SRS transmissions from a UE in successive slot symbols needs to be enabled in order to improve accuracy for a channel estimate or for a timing estimate for the UE at a gNB. Moreover, existing communication systems do not enable link adaptation for UL transmissions prior to the UE completing a random access process. It can be beneficial for a UE to provide to a gNB an estimate of an UL channel medium the UE experiences and, in case of a TDD system, also an estimate of a DL channel medium. A gNB can also obtain a path-loss measurement for a UE from a received SRS transmission from the UE. This can be achieved by the UE transmitting SRS in a same slot as a PUSCH transmission, known as Msg3, associated with a random access process.

Another objective of 5G systems is to enable a network to instantaneously adapt to traffic characteristics and enable time domain multiplexing (TDM) of traffic types with different transmission characteristics that can possibly include different slot symbol durations or different slot durations. This objective requires that, for TDD operation, a slot type (DL, UL, or hybrid) is not predetermined, at least for some slots, and can be adjusted per slot based on gNB scheduling. Adjusting a slot type among gNBs in an uncoordinated manner can create cross-link interference in neighboring cells served by the gNBs when a different slot type is used for transmission in each cell for a TDD system. Cross-link interference cancellation is then required particularly at a gNB as DL interference is typically much stronger than UL interference. To enable such interference cancellation at a first gNB, in addition to information related to scheduling of DL transmissions from an interfering second gNB, the first gNB needs to be able to obtain accurate estimates of a channel medium experienced by interfering DL transmissions from the second gNB and UL transmission to the first gNB. This can be facilitated by enabling orthogonal, interference-free, transmissions of DL DMRS and UL DMRS.

Another objective of 5G systems is to improve a spectral efficiency and enable support of higher data rates. One associated requirement is an improvement in a DL CSI estimate based on a CSI-RS or in an UL CSI based on SRS transmissions, and a reduction in an overhead resulting from CSI-RS or SRS transmissions.

Another objective of 5G systems is to improve a tradeoff between improving a demodulation reliability of received modulated data symbols or control symbols and reducing a resource overhead or an interference associated with DL DMRS or UL DMRS transmissions that are used to provide an estimate of a channel medium used to perform the demodulation.

Therefore, there is a need to enable a gNB to inform all UEs with receptions of DL transmissions in one or more cells of respective one or more CSI-RS transmissions in the one or more cells.

There is another need to enable a gNB to trigger CSI reports from a group of UEs through respective PUCCH transmissions.

There is another need for a gNB to trigger SRS transmissions from a group of UEs in dynamically determined resources.

There is another need to increase an SRS multiplexing capacity and to enable multiplexing of DMRS and SRS transmissions of different BWs in a same slot symbol.

There is another need to enable SRS transmission in a same slot as a PUSCH transmission associated with a random access process.

There is another need to enable orthogonal multiplexing of DL DMRS and UL DMRS in a same slot and over a same BW.

There is another need to improve a reliability of channel estimates obtained from CSI-RS transmissions or SRS transmissions and reduce an associated overhead.

There is another need to reduce a resource overhead or an interference associated with DL DMRS or UL DMRS transmissions.

Finally, there is another need to enable dynamic TDD operation by estimating and cancelling DL interference at a reception point in order to achieve target reception reliability for an UL transmission.

The present disclosure relates to a pre-$5^{th}$-generation (5G) or 5G communication system to be provided for supporting higher data rates beyond $4^{th}$-Generation (4G) communication system such as long term evolution (LTE). The present disclosure relates to informing all UEs with receptions of DL transmissions in one or more cells of respective one or more CSI-RS transmissions in the one or more cells. The disclosure also relates to enabling a gNB to trigger CSI reports from a group of UEs through respective PUCCH transmissions. The disclosure additionally relates to enabling a gNB to trigger SRS transmissions from a group of UEs in dynamically determined resources. The disclosure further relates to increasing an SRS multiplexing capacity and to enabling multiplexing of DMRS and SRS transmissions of different BWs in a same slot symbol. The disclosure also relates to enabling SRS transmission in a same slot a PUSCH transmission associated with a random access process. The disclosure additionally relates to enabling orthogonal multiplexing of DL DMRS and UL DMRS in a same slot and over a same BW. The disclosure additionally relates to improving a reliability of channel estimates obtained from CSI-RS transmissions or SRS transmissions and reducing an associated overhead. The disclosure further relates to reducing a resource overhead or an interference associated with DL DMRS or UL DMRS transmissions. The disclosure additionally relates to enabling dynamic TDD operation by estimating and cancelling DL interference at a reception point in order to achieve target reception reliability for an UL transmission.

In some embodiments, CSI-RS transmission by a gNB is dynamic and indicated by the gNB through DL control signaling in the physical layer. As a CSI-RS transmission on a cell can be used for measurements by a group of UEs in the cell and all CSI-RS transmissions in a slot need to be informed to a UE receiving a PDSCH transmission in the slot regardless of whether or not a particular configuration for a CSI-RS transmission is intended for the UE, a gNB can indicate a CSI-RS transmission to UEs through a UE-common PDCCH conveying a UE-common DCI format that additionally conveys a configuration of parameters for the CSI-RS transmission. In the following, unless explicitly mentioned otherwise, a UE is assumed to be configured by higher layers a CSI-RS resource configuration ID, a number of CSI-RS ports, a CSI-RS configuration, a reference PDSCH transmission power, $P_c$ for CSI feedback for each CSI process, and a pseudo-random sequence generator parameter $n_{ID}$. However, to enable certain applications, some of the above parameters can also be provided by a DCI format as it is subsequently described.

A gNB can configure by higher layer signaling a UE with a CSI-RS-RNTI for scrambling a CRC of a DCI format that is transmitted in a first slot and conveys an indication for a CSI-RS transmission in a second slot that can be same as or different than the first slot and also conveys configurations for respective CSI-RS transmission parameters. For brevity, this DCI format is referred to a DCI format A. The DCI format A can have a same size as another DCI format that a UE monitors, for example for scheduling unicast PDSCH or PUSCH transmissions and padding of bit can then be used, when necessary, to result to DCI formats of same size.

When a CSI-RS-RNTI, or any other RNTI, can be common to all UEs configured for DL communication in a cell where an associated DCI format A is transmitted, a gNB can signal the CSI-RS-RNTI by UE-common higher layer signaling such as by system information; otherwise, the gNB can configure the CSI-RS-RNTI in a UE-specific manner using higher layer signaling such as RRC signaling. It is typical that a CSI-RS configuration is UE-specific and therefore a CSI-RS-RNTI can be common to a group of UEs configured for DL communication on a cell instead of being common to all such UEs. UE-specific higher layer signaling enables any grouping of UEs. The same applies for a configuration for a PUCCH transmission or for a SRS transmission as they are subsequently described.

A DCI format A can include one or more of the following fields (also referred to as information elements (IEs)): (1) $n_{offset}$ indicating a slot offset for the CSI-RS transmission relative to the slot of the DCI format A transmission. Therefore, when a DCI format A is transmitted in slot n, a respective CSI-RS is transmitted in slot $n+n_{offset}$. For example, $n_{offset}$ can include 2 bits with numeric values of 0, 1, 2, and 3; (2) $n_{offset}$ indicating a feedback delay offset for a transmission of a CSI report based on the CSI-RS transmission. Therefore, when a DCI format A is transmitted in slot n, indicates a slot offset of $n_{offset}$ slots for a CSI-RS transmission, a UE transmits a respective CSI report in slot $n+n_{offset}+k_{min}+k_{offset}$ where $k_{min}$ is a predetermined value such as 1. For example, $k_{offset}$ can include 3 bits with numeric values of 0, 1, 2, 3, 4, 5, 6, and 7; (3) CSI process indication. For example, for a total of 4 processes, the CSI process field includes 2 bits that enumerate a CSI process; and $k_{CSI}$ indicating the symbols in slot $n+n_{offset}$ used for CSI-RS transmission. For example, $k_{CSI}$ can include 2 bits with first, second, and third values respectively indicating that a last slot symbol, or a second to last slot symbol, or both a second to last and a last slot symbols are used for CSI-RS transmission and a fourth value being reserved.

Regardless of whether or not a DCI format scheduling a PDSCH transmission to a UE (unicast DCI format) includes parameters associated with a CSI-RS transmission, mapping of a PDSCH transmission to REs can be according to a CSI-RS transmission configuration as indicated by DCI format A. This is because a configuration for CSI-RS transmissions conveyed by DCI format A can include each configuration for CSI-RS transmission conveyed by a unicast DCI format and different UEs can have different configuration for CSI transmission in a slot. An exception can be when a UE fails to detect DCI format A. or when DCI format A is not transmitted in a slot, and the UE detects a unicast DCI format scheduling a PDSCH. To ensure correct RE mapping by the UE, a unicast DCI format (for example, having a CRC scrambled by a UE-specific C-RNTI) can also indicate a configuration for a CSI-RS transmission in a same slot as the slot of the PDSCH transmission using same parameters as DCI format A but the unicast DCI format does not need to include the parameter $n_{offset}$. When a DCI format A and a UE-specific DCI format convey different CSI-RS configurations, a UE can prioritize the DCI format that was later received; when both DCI formats are received during a same PDCCH monitoring period, the UE can prioritize DCI format A or the UE-specific DCI format either by gNB configuration or be specification.

Figure 10:
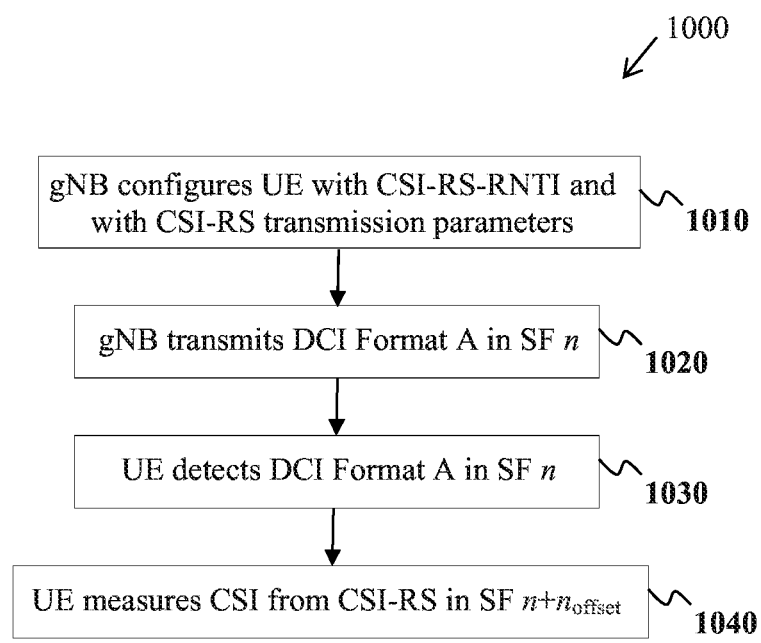
FIG. 10 illustrates an example scheduling method of a CSI-RS transmission by a DCI format A according to embodiments of the present disclosure.

FIG. 10 illustrates an example scheduling method 1000 of a CSI-RS transmission by a DCI format A according to embodiments of the present disclosure. An embodiment of the scheduling method 1000 of a CSI-RS transmission by a DCI format A shown in FIG. 10 is for illustration only. Other embodiments may be used without departing from the scope of the present disclosure.

A gNB configures, in step 1010, a UE with a CSI-RS-RNTI for scrambling a CRC of a DCI format A and with parameters associated with a CSI-RS transmission as they were previously described. The gNB transmits, in step 1020, a DCI format A in a slot n that includes a parameter $n_{offset}$ to indicate a slot offset for the CSI-RS transmission relative to the slot of the DCI format A transmission, or a parameter indicating a CSI process, or a parameter $k_{CSI}$ indicating one or more symbols in slot $n+n_{offset}$ for CSI-RS transmission. The UE detects, in step 1030, the DCI format A in slot n. In step 1040, the UE performs a CSI measurement in slot $n+n_{offset}$ based on the indicated parameters for the CSI-RS transmission.

Several variations and additions to fields of a DCI format A can exist as well as their combinations. In one example, a DCI format A includes more than one $n_{offset}$ fields to indicate CSI-RS transmission in respective more than one slot. For example, a DCI format A transmitted in slot n can include two $n_{offset}$ fields, $n_{offset,1}$ and $n_{offset,2}$, respectively indicating CSI-RS transmission in slot $n+n_{offset,1}$ and in slot $n+n_{offset,2}$. When a value of $n_{offset}$ is not larger than a value of $n_{offset,1}$ CSI-RS is transmitted only in slot $n+n_{offset,1}$ and there is no CSI-RS transmission in $n+n_{offset,2}$. In a variation of the aforementioned example, a DCI format A can include one $n_{offset}$ field and a "CSI-RS slots number" field where the first slot for CSI-RS transmission is determined based on the $n_{offset}$ field and an additional number of successive DL slots, as indicated by a value of the CSI-RS slots number field, convey additional CSI-RS transmissions. For example, the CSI-RS slot number field can include 2 bits where the values "00," "01," "10," and "11" indicate respectively no additional slot for CSI-RS transmission and CSI-RS transmissions that occur in the next, two next, and three next DL slots relative to the slot determined by the $n_{offset}$ value.

In another example, a DCI format A can include respective more than one field for $k_{offset}$ or a single $k_{offset}$ can be signaled and additional $k_{offset}$ values can be determined from the $n_{offset}$ set values. For example, a single $k_{offset}$ is signaled and is either configured to be same for CSI reporting for both $n_{offset,1}$ and $n_{offset,2}$, or $k_{offset}$ is interpreted as $k_{offset,1}$ for $n_{offset,1}$ and $k_{offset,2}$ is computed relative to a predetermined offset to $k_{offset,1}$ such as $k_{offset,2}=k_{offset,1}+n_{offset,2}-n_{offset,1}$.

In yet another example, multiple CSI processes can be indicated and either different $k_{CSI}$ values can be explicitly or implicitly associated with different CSI processes or different CSI-RS multiplexing for a same $k_{CSI}$ value can be associated with different CSI processes. For example, there can be 4 predetermined locations of binary elements in DCI format A with one-to-one mapping to the 4 CSI processes where a binary element indicates whether or not there is a CSI-RS transmission for an associated CSI process. For example, for an implicit determination of the slot symbols with CSI-RS transmission for a CSI process, when 2 CSI process are indicated by DCI format A, there are two respective CSI-RS transmissions where the first CSI-RS transmission, for example for the CSI process with a lowest index, is in the slot symbols indicated by the $k_{CSI}$ value and the second CSI-RS transmission is in the slot symbols prior the slot symbols indicated by the $k_{CSI}$ value. When DCI format A indicates CSI-RS transmission over more than one slots through respective more than one $n_{offset}$ fields or through a CSI slot number field, a same $k_{CSI}$ value can apply in the more than one slots while for the CSI process determination either a separate indication per slot or an implicit indication based on the CSI process indicated for the first slot with CSI-RS transmission can apply. For example, for 4 CSI processes, when DCI format A indicates that CSI-RS transmission in a first slot is associated with CSI process 3, a UE can implicitly determine that CSI-RS transmission in a second slot, after the first slot, is associated with CSI process 0.

Table 1 provides first exemplary fields for a DCI format A indicating CSI-RS transmission to a group of UEs.

TABLE 1

First exemplary fields for a DCI format A indicating CSI-RS transmission to a group of UEs

| DCI Format A Field | Number of Bits | Functionality |
|---|---|---|
| $n_{offset}$ | 2 | slot offset for CSI-RS relative to slot of DCI format A |
| $k_{offset}$ | 3 | Feedback delay offset for CSI report transmission from CSI-RS |
| CSI process | 4 | 1-to-1 mapping whether there is CSI-RS for respective CSI process |
| $k_{CSI}$ | 2 | slot symbols for CSI-RS for CSI process with lowest index |
| Padding Bits | As needed | When DCI format A size needs to equal another DCI format size |
| CRC/RNTI | 16 | CRC/CSI-RS-RNTI |

Table 2 provides second exemplary fields for a DCI format A indicating CSI-RS transmission to a group of UEs.

TABLE 2

Second exemplary fields for a DCI format A indicating CSI-RS transmission to a group of UEs

| DCI Format A Field | Number of Bits | Functionality |
|---|---|---|
| $n_{offset,1}$, $n_{offset,2}$ | 2 + 2 | 2 slot offset for 2 CSI-RS relative to slot of DCI format A |
| $k_{offset}$ | 3 | Feedback delay offset for CSI report transmission from first CSI-RS |
| CSI process | 4 + 4 | 1-to-1 mapping whether there is CSI-RS 2- for respective CSI process |
| $k_{CSI}$ | 2 | slot symbols for CSI-RS for CSI process with lowest index |
| Padding Bits | As needed | When DCI format A size needs to equal another DCI format size |
| CRC/RNTI | 16 | CRC/CSI-RS-RNTI |

Figure 11:
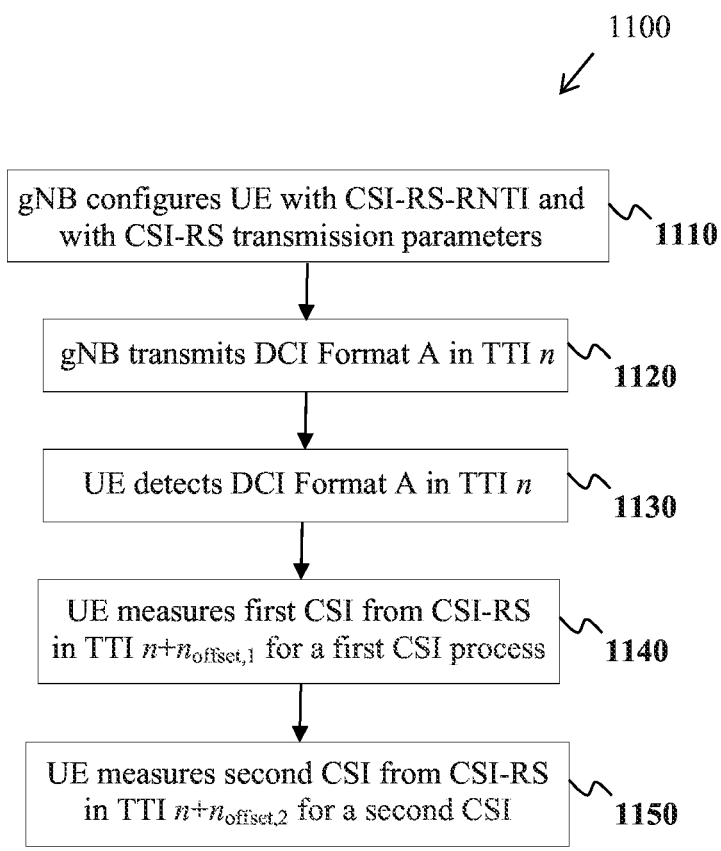
FIG. 11 illustrates an example scheduling method of a CSI-RS transmission by a DCI format A in a first slot and in a second slot according to embodiments of the present disclosure.

FIG. 11 illustrates an example scheduling method 1100 of a CSI-RS transmission by a DCI format A in a first slot and in a second slot according to embodiments of the present disclosure. An embodiment of the scheduling method 1100 of a CSI-RS transmission by a DCI format A in a first slot and in a second slot shown in FIG. 11 is for illustration only. Other embodiments may be used without departing from the scope of the present disclosure.

A gNB configures, in step 1110, a UE with a CSI-RS-RNTI for scrambling a CRC of a DCI format A and with parameters associated with a CSI-RS transmission as they were previously described. The gNB transmits, in step 1120, a DCI format A in a slot n that includes a first parameter $n_{offset,1}$ to indicate a first slot offset for the CSI-RS transmission relative to the slot of the DCI format A transmission and a second parameter $n_{offset,2}$ to indicate a second slot offset for the CSI-RS transmission relative to the slot of the DCI format A transmission. The DCI format A also includes indication for a first CSI process and for a second CSI process unless there is a predetermined implicit rule to determine the second CSI process from the first CSI process. The UE detects the DCI format A in slot n in step 1130. The UE performs, in step 1140, a CSI measurement in slot $n+n_{offset,1}$ based on the indicated parameters for the CSI-RS transmission for the first CSI process. In step 1150, the UE performs a CSI measurement in slot $n+n_{offset,2}$ based on the indicated parameters for the CSI-RS transmission for the second CSI process.

In another example, as previously described, a CSI process identification field in DCI format A can be a bitmap, for example of four bits mapping to four CSI processes. A DCI format A transmission in slot n can include a single $n_{offset}$ field when CSI-RS transmission corresponding to all indicated CSI processes are in a same slot ($n+n_{offset}$), or can include up to four $n_{offset}$ fields, each corresponding to a bit in the bitmap representing the CSI process identification field, or a combination thereof. The DCI format A can include a single $k_{offset}$ field when transmission of CSI reports corresponding to all indicated CSI processes are in a same slot ($n+n_{offset}+k_{min}+k_{offset}$) or in implicitly determined slots relative to an indicated slot ($n+n_{offset}+k_{min}+k_{offset}$) for a first CSI report, or can include up to four $k_{offset}$ fields, each corresponding to a bit in the bitmap representing the CSI process identification field, or a combination thereof. The DCI format A can include a single $k_{CSI}$ when the DCI format A includes up to four $n_{offset}$ fields or when slot symbols for CSI-RS transmission associated with CSI processes other than a first CSI process are implicitly determined. For example, when a last slot symbol is indicated for CSI-RS transmission for a first CSI process (first bit in bitmap with value "1"), a second to last slot symbol is implicitly indicated for CSI-RS transmission for a second CSI process (second bit in bitmap with value "1"), and so on. For example, when a last two slot symbols are indicated for CSI-RS transmission for a first CSI process (first bit in bitmap with value "1"), two slot symbols immediately prior to the last two slot symbols are implicitly indicated for CSI-RS transmission for a second CSI process (second bit in bitmap with value "1"), and so on. Alternatively, instead of being relative to the end of a slot, slot symbols for CSI-RS transmission for a first CSI process can be relative to the beginning of a slot and can further be conditioned to be after slot symbols in the beginning of a slot that are used for transmission of DL control signaling.

Figure 12:
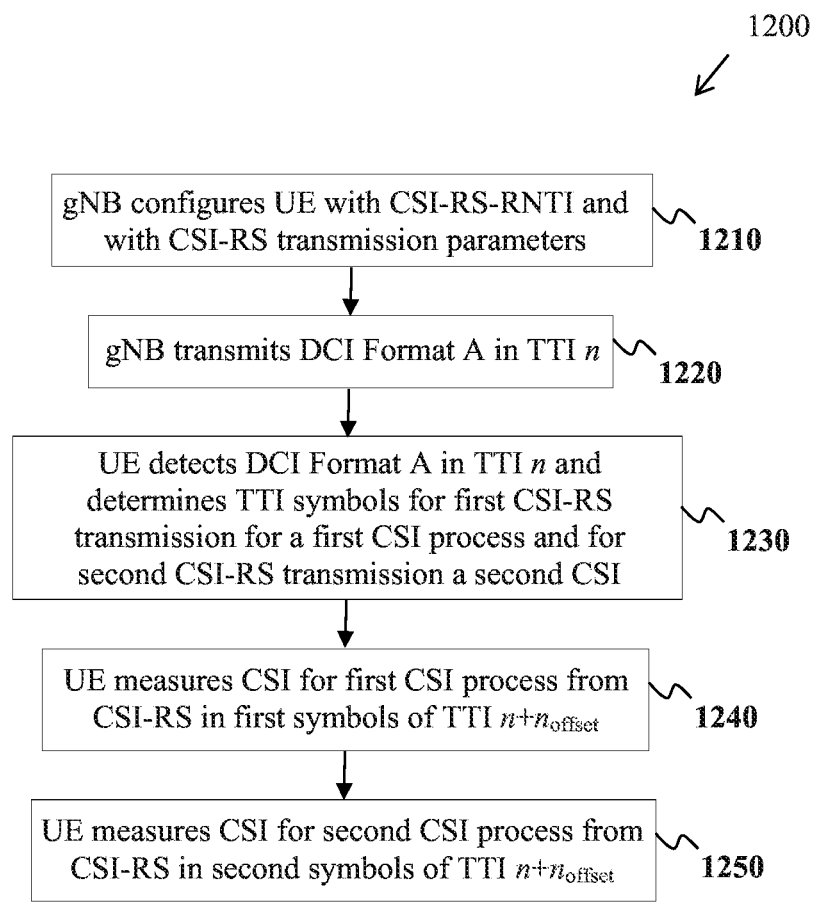
FIG. 12 illustrates an example scheduling method of multiple CSI-RS transmissions for respective multiple CSI processes in a same slot by a DCI format A according to embodiments of the present disclosure.

FIG. 12 illustrates an example scheduling method 1200 of multiple CSI-RS transmissions for respective multiple CSI processes in a same slot by a DCI format A according to embodiments of the present disclosure. An embodiment of the scheduling method 1200 of multiple CSI-RS transmissions for respective multiple CSI processes in a same slot by a DCI format A shown in FIG. 12 is for illustration only. Other embodiments may be used without departing from the scope of the present disclosure.

A gNB configures, in step 1210, a UE with a CSI-RS-RNTI for scrambling a CRC of a DCI format A and with parameters associated with a CSI-RS transmission as they were previously described. The gNB transmits, in step 1220, a DCI format A in a slot n that includes a parameter $n_{offset}$ to indicate a slot offset for the CSI-RS transmission relative to the slot of the DCI format A transmission. The DCI format A also includes an indication for a number of CSI processes. The UE detects the DCI format A in slot in in step 1230. The UE performs, in step 1240, a CSI measurement in first symbols of slot $n+n_{offset}$ based on the indicated parameters for the CSI-RS transmission for a first CSI process and performs, in step 1250, a CSI measurement in second symbols of slot $n+n_{offset}$ based on the indicated parameters for the CSI-RS transmission for a second CSI process.

In yet another example, a DCI format A further includes a cell identification field indicating a number of cells with CSI-RS transmission in slot $n+n_{offset}$. A gNB can configure a UE a number of cells and respective indexes. For example, the cell identification field can include a bitmap with each bit having a one-to-one association with each of the four cells to indicate, for example through a bitmap value of "1" for a respective cell, CSI-RS transmission in slot $n+n_{offset}$ in the cell. The aforementioned examples can also be combined together.

Figure 13:
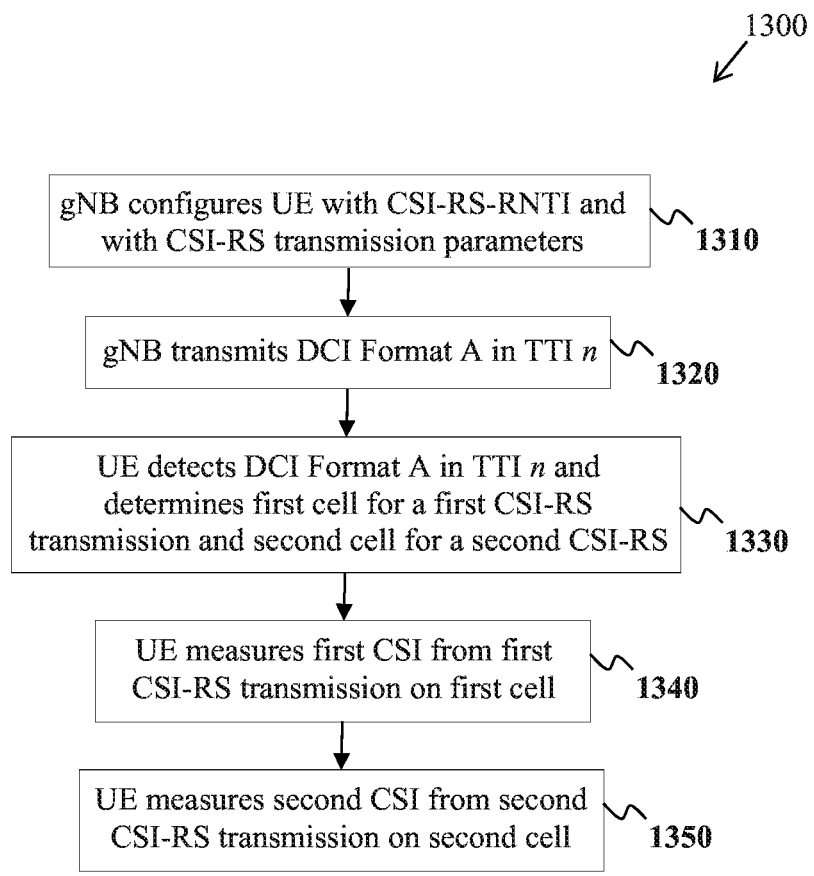
FIG. 13 illustrates an example scheduling method of multiple CSI-RS transmissions on respective multiple cells by a DCI format A according to embodiments of the present disclosure.

FIG. 13 illustrates an example scheduling method 1300 of multiple CSI-RS transmissions on respective multiple cells by a DCI format A according to embodiments of the present disclosure. An embodiment of the scheduling method 1300 of multiple CSI-RS transmissions on respective multiple cells by a DCI format A shown in FIG. 13 is for illustration only. Other embodiments may be used without departing from the scope of the present disclosure.

A gNB configures, in step 1310, a UE with a CSI-RS-RNTI for scrambling a CRC of a DCI format A and with parameters associated with a CSI-RS transmission as they were previously described. The gNB transmits, in step 1320, a DCI format A in a slot n that includes a field indicating multiple cells for respective CSI-RS transmissions. The CSI-RS transmissions can be in same or different slots and can be associated with a same or with different CSI processes. The UE detects the DCI format A in slot n in step 1330. The UE performs, in step 1340, a first CSI measurement for a first CSI process based on an indicated CSI-RS transmission in a first slot on a first cell. In step 1350, the UE performs a second CSI measurement for a second CSI process based on an indicated CSI-RS transmission in a second slot on a second cell.

In yet another example, one state of the $k_{CSI}$ field can indicate that an entire slot ($n+n_{offset}$), with the possible exception of first slot symbols used for transmission of DL control signaling, is used for CSI-RS transmission. For example, when $k_{CSI}$ includes 2 bits, a value of "11" can indicate that all available symbols in a slot ($n+n_{offset}$) are used for CSI-RS transmission. This can be useful for supporting transmissions of CSI-RS for multiple CSI processes or of ZP CSI-RS associated with one or more CSI-IM.

In yet another example, an index for a CSI-RS scrambling sequence identity, $n_{ID}$, is also included in DCI format A. For example, a field that includes one bit can enable dynamic switching between a first configured scrambling sequence identity when CSI-RS is transmitted from a first transmission point and a second configured scrambling sequence identity when CSI-RS is transmitted from a second transmission point or second transmission points in accordance with CoMP transmission operation. The use of a first scrambling sequence or a second scrambling sequence can be additionally associated with a first reference PDSCH transmission power for CSI feedback or with a second reference PDSCH transmission power for CSI feedback.

In yet another example, a DCI format A does not include a $k_{offset}$ field. Instead, a $k_{offset}$ field is provided in a DCI format scheduling a transmission of CSI reports as it is subsequently described.

In some embodiments, triggering of PUCCH transmissions from UEs for CSI reporting is considered. A UE can be configured with a CSI-PUCCH-RNTI for scrambling a CRC of a DCI format that conveys an indication for transmission of CSI reports from one or more UEs and configurations for respective transmission parameters. For brevity, this DCI format is referred to a DCI format B. The DCI format B can have a same size as another DCI format that a UE monitors, for example for scheduling unicast PDSCH or PUSCH transmissions.

A DCI format B can include one or more of the following fields: (1) a CSI report triggering field for transmission of CSI reports from a group of UEs. For example, the CSI report triggering field can be a bitmap with each bit having a one-to-one association with each of the UEs configured by higher layers with a same CSI-PUCCH-RNTI. A UE is also configured by higher layers with a location in the bitmap. For example, the bitmap can include 8 bits, be associated with 8 UEs, and a particular UE can be configured a location corresponding to a third bit in the bitmap; (2) a TPC command field indicating TPC values to respective UEs. The TPC command field can be a bitmap associating TPC values to UEs similar to the CSI report triggering field. For example, a TPC command field can include 16 bits to convey 8 TPC commands, each of 2 bits, to 8 UEs. A one-to-one association between UEs and TPC commands is same as the one-to-one association for the CSI report triggering field. The TPC command field and the CSI report triggering field can also be combined into a single field that couples a CSI report trigger on a PUCCH and a respective TPC command for a UE. For example, a combined CSI report triggering and TPC command field can include 24 bits, in 8 sets of 3 bits, with each set of 3 bits having a one-to-one association with a UE from a group of up to 8 UEs and with a first bit indicating whether or not a UE shall transmit a CSI report on a PUCCH and the second and third bits providing a respective TPC command value. Alternatively, TPC commands can be provided by a separate DCI format; (3) a PUCCH resource field indicating a PUCCH resource. The PUCCH resource field can indicate a PUCCH resource for a CSI report transmission from a first UE, as identified by a location in the bitmap, that a CSI report transmission is triggered. A PUCCH resource for a CSI report transmission from each of the remaining UEs that a CSI report transmission is triggered can be determined in a sequential manner relative to the indicated PUCCH resource. For example, a second PUCCH resource for a CSI report transmission from a second UE that a CSI report transmission is triggered can be the one that is immediately next to the indicated PUCCH resource, a third PUCCH resource for a CSI report transmission from a third UE that a CSI report transmission is triggered can be the one that is immediately next to the second PUCCH resource, and so on. Instead of an indication of a reference PUCCH resource in DCI format B, a gNB can configure a reference PUCCH resource by higher layer signaling to the group of UEs and can also be a function of a slot of the DCI format B transmission; and (4) $k_{offset}$ indicating a feedback delay offset for a PUCCH transmission conveying a CSI report based on a CSI-RS transmission as it was previously described.

Figure 14:
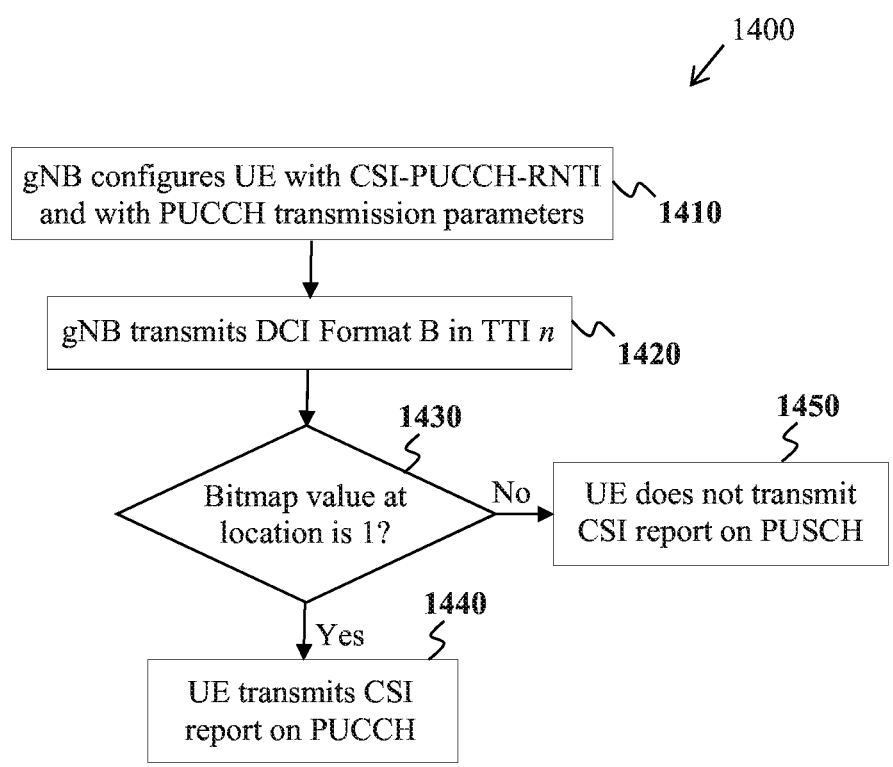
FIG. 14 illustrates an example scheduling method of PUCCH transmissions from a group of UEs by a DCI format B according to embodiments of the present disclosure.

FIG. 14 illustrates an example scheduling method 1400 of PUCCH transmissions from a group of UEs by a DCI format B according to embodiments of the present disclosure. An embodiment of the scheduling method 1400 of PUCCH transmissions from a group of UEs by a DCI format B shown in FIG. 14 is for illustration only. Other embodiments may be used without departing from the scope of the present disclosure.

A gNB configures, in step 1410, by higher layers a UE with a CSI-PUCCH-RNTI for scrambling a CRC of a DCI format B and with parameters associated with a PUCCH transmission conveying a CSI report from the UE. For example, configured parameters for a PUCCH transmission can include ones related to power control or to a PUCCH resource when it is not determined by a field in DCI format B. The gNB transmits, in step 1420, a DCI format B in a slot n. The DCI format B includes a CSI report triggering field providing a bitmap and the UE is configured a location in the bitmap. When the bitmap bit in the location is "1" in step 1430, the UE transmits, in step 1440, a CSI report in a PUCCH and in slot $n+k_{offset}$ where $k_{offset}$ is a value of a field in DCI format B; otherwise, when the bitmap bit in the location is "0," the UE does not transmit a CSI report in step 1450.

Figure 15:
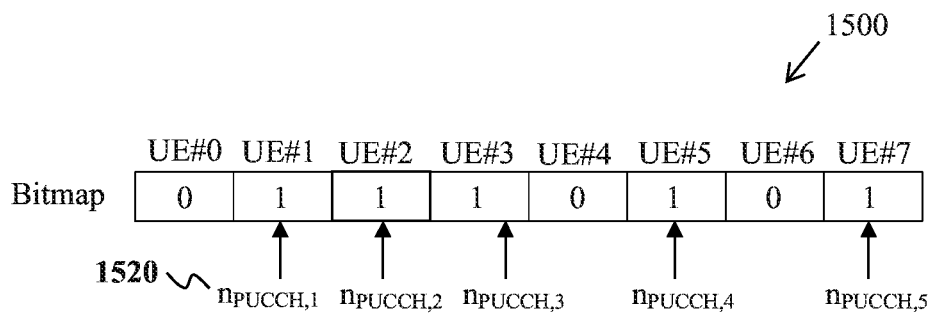
FIG. 15 illustrates an example determination of a PUCCH resource from a CSI report triggering field and a reference PUCCH resource field in a DCI format B according to embodiments of the present disclosure.

FIG. 15 illustrates an example determination of a PUCCH resource 1500 from a CSI report triggering field and a reference PUCCH resource field in a DCI format B according to embodiments of the present disclosure. An embodiment of the determination of a PUCCH resource 1500 from a CSI report triggering field and a reference PUCCH resource field in a DCI format B shown in FIG. 15 is for illustration only. Other embodiments may be used without departing from the scope of the present disclosure.

A gNB configures by higher layers to UEs a CSI-PUCCH-RNTI for scrambling a CRC of a DCI format B that conveys a bitmap of 8 bits 1510. The gNB also configures by higher layers each UE a location in the bitmap. The DCI format B can also convey a reference PUCCH resource, $n_{PUCCH,1}$, for a CSI report transmission 1520 or the gNB can configure the reference PUCCH resource to the UEs by higher layer signaling. A UE transmits a CSI report in a PUCCH when a value in the bitmap at a location the UE is configured is equal to "1." A first UE, such as UE #1 1530, with a configured location in the bitmap that is the first location with a value of "1" uses the reference PUCCH resource $n_{PUCCH,1}$ to transmit a CSI report. Another UE, such as UE #5 1540, determines a PUCCH resource for a CSI report transmission based on $n_{PUCCH,1}$ and the number of bits that have a value of "1" in earlier locations in the bitmap than the location for UE #5. Consequently, UE #5 determines the fourth PUCCH resource, $n_{PUCCH,4}$, (third PUCCH resources after the reference PUCCH resource) for a transmission of a CSI report.

A DCI format A indicating one or more CSI-RS transmissions to a group of UEs and a DCI format B triggering associated CSI reports from a group of UEs can be combined in a single DCI format, DCI format AB, with a configured RNTI such as for example a CSI-RS-RNTI. DCI format AB can include the parameters of DCI format A and the parameters of DCI format B. When CSI-RS for multiple CSI processes is indicated by DCI format AB and CSI processes are not indicated to a UE for CSI reporting, a CSI report from the UE can be for every indicated CSI process that is also among the CSI processes the UE is configured to report.

Table 3 provides first exemplary fields for a DCI format AB indicating CSI-RS transmission to a group of UEs and triggering CSI reports from the group of UEs where CSI processes for a CSI report are explicitly indicated.

TABLE 3

First exemplary fields for DCI format AB indicating CSI-RS transmission and CSI reporting to a group of UEs

| DCI Format AB Field | Number of Bits | Functionality |
|---|---|---|
| $n_{offset}$ | 2 | 2 slot offset for 2 CSI-RS relative to slot of DCI format A |
| $k_{offset}$ | 3 | Feedback delay offset for CSI report transmission from first CSI-RS |
| $k_{CSI}$ | 2 | slot symbols for CSI-RS for CSI process with lowest index |
| UE Bitmap and CSI process | 8 + 16 | UEs triggered CSI report and associated CSI process for each UE |
| $n_{PUCCH}$ | 3 | PUCCH resource for CSI report transmission from first UE |
| Padding Bits | As needed | For DCI format size to equal another DCI format size |
| CRC/RNTI | 16 | CRC/CSI-RS-RNTI |

Table 4 provides second exemplary fields for a DCI format AB indicating CSI-RS transmission to a group of UEs and triggering CSI reports from the group of UEs where a UE triggered a CSI report includes all CSI processes with respective CSI-RS transmission in the slot among the CSI processes the UE is configured to report.

TABLE 4

Second exemplary fields for DCI format AB indicating CSI-RS transmission and CSI reporting to a group of UEs

| DCI Format AB Field | Number of Bits | Functionality |
|---|---|---|
| $n_{offset}$ | 2 | 2 slot offset for 2 CSI-RS relative to slot of DCI format A |
| $k_{offset}$ | 3 | Feedback delay offset for CSI report transmission from first CSI-RS |
| $k_{CSI}$ | 2 | slot symbols for CSI-RS for CSI process with lowest index |
| CSI process | 4 | 1-to-1 mapping whether there is CSI-RS for respective CSI process |
| UE Bitmap | 16 | UEs triggered CSI report and associated CSI process for each UE |
| $n_{PUCCH}$ | 3 | PUCCH resource for CSI report transmission from first UE |
| Padding Bits | As needed | For DCI format size to equal another DCI format size |
| CRC/RNTI | 16 | CRC/CSI-RS-RNTI |

In some embodiments, SRS transmission from one or more UEs from a group of UEs can be dynamic and indicated by a gNB through DL control signaling in the physical layer. In the following, unless explicitly mentioned otherwise, a UE is assumed to be configured for SRS transmission from each antenna port with one or more of a transmission comb, a cyclic shift, a transmission BW, a ZC sequence, a starting resource block, and a number of antenna ports. For example, the configuration can be for antenna port 0 and the parameters for remaining antenna ports can be derived by the UE relative to antenna port 0.

A UE can be configured with an SRS-RNTI for scrambling a CRC of a DCI format that conveys an indication for an SRS transmission and configurations for respective transmission parameters. For brevity, this DCI format is referred to as a DCI format C. The DCI format C can have a same size as another DCI format that a UE monitors, for example for scheduling unicast PDSCH or PUSCH transmissions.

A DCI format C can include one or more of the following fields: (1) an SRS triggering field for SRS transmissions from UEs. For example, the SRS triggering field can be a bitmap with each bit having a one-to-one association with a gNB configuring each of the UEs with a same SRS-RNTI. The gNB also configures each UE a location in the bitmap. For example, the bitmap can include 8 bits, associated with 8 UEs, and a particular UE can be configured a location corresponding to a third bit in the bitmap; (2) $k_{SRS}$ indicating an SRS reference resource configuration that can include slot symbols for SRS transmission. For example the SRS reference resource configuration can include 3 bits to indicate combinations of one or more slot symbols from last slot symbols for SRS transmission such as a last slot symbol, a second last slot symbol, a third last slot symbol, two last slot symbols, and so on; and (3) $l_{offset}$ an indicating a slot offset for SRS transmission. Therefore, when a DCI format C is transmitted in slot n, indicates a slot offset of $l_{offset}$ slots for an SRS transmission, a UE transmits a respective SRS in slot $n+l_{min}+l_{offset}$ where $l_{min}$ is a predetermined value such as 1. For example, $l_{offset}$ can include 2 bits.

Figure 16:
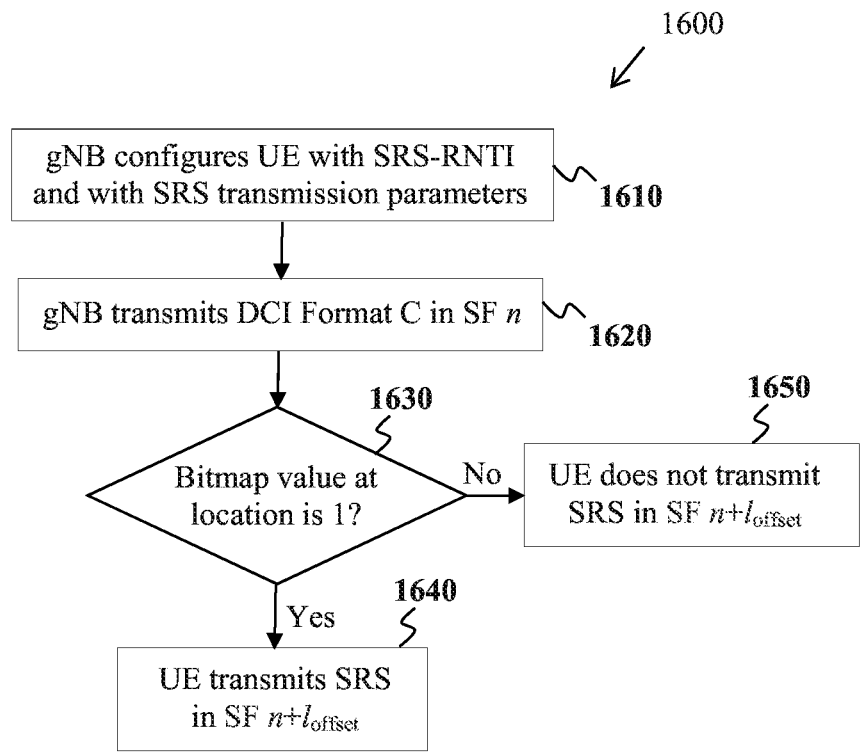
FIG. 16 illustrates an example scheduling method of SRS transmissions from a group of UEs by a DCI format C according to embodiments of the present disclosure.

FIG. 16 illustrates an example scheduling method 1600 of SRS transmissions from a group of UEs by a DCI format C according to embodiments of the present disclosure. An embodiment of the scheduling method 1600 of SRS transmissions from a group of UEs by a DCI format C shown in FIG. 16 is for illustration only. Other embodiments may be used without departing from the scope of the present disclosure.

A gNB configures, in step 1610, a UE with an SRS-RNTI for scrambling a CRC of a DCI format C and with parameters associated with an SRS transmission from the UE. For example, configured parameters for an SRS transmission can include a starting RB in a BW, an SRS transmission BW, a comb, a cyclic shift, a ZC sequence, and parameters related to SRS transmission power control. The gNB transmits a DCI format C in a slot n in step 1620. The DCI format C includes an SRS triggering field providing a bitmap and the UE is configured a location in the bitmap. When the bitmap bit in the location is "1" in step 1630, the UE transmits, in step 1640, an SRS in slot $n+l_{offset}$ and in a symbol of slot $n+l_{offset}$, where $l_{offset}$ is a value of a respective field in DCI format C and the symbol of slot $n+l_{offset}$ is determined by a value of a respective filed in DCI format C; otherwise, when the bitmap bit in the location is "0," the UE does not transmit an SRS in step 1650.

Several variations and additions to fields of a DCI format C can also exist as well as their combinations. In one example, a DCI format C includes a cyclic shift configuration field indicating a cyclic shift for an SRS transmission from a first UE and a comb configuration field indicating a comb for an SRS transmission from the first UE. For example, for 8 cyclic shifts and for four combs, the cyclic shift configuration field includes 3 bits and the comb configuration field includes 2 bits. A second UE can transmit SRS with a same comb as the first UE and with a next cyclic shift. When the first UE transmits SRS with a last, for example eighth, cyclic shift, the second UE can transmit SRS with the first cyclic shift and the next comb. When the first UE also transmits SRS with the last, for example fourth, comb, the second UE can transmit SRS with the first cyclic shift and the first comb in a next slot symbol. Therefore, a UE can determine a resource for an SRS transmission in a similar manner as a UE determines a resource for a PUCCH transmission as described in FIG. 15.

In another example, a TPC command field indicating TPC values to respective UEs is included in DCI format C. The TPC command field is a bitmap and an association with the SRS triggering field can be as described relative to the CSI report triggering field for DCI format B.

In yet another example, an SRS scrambling sequence identity is also included in DCI format C. For example, a field that includes one bit can enable dynamic switching for SRS transmission intended for reception at a first reception point (first scrambling sequence is used) and SRS transmission intended for reception at a second reception point or at multiple reception points in accordance with CoMP reception operation (second scrambling sequence is used). The use of a first scrambling sequence or a second scrambling sequence can be additionally associated with a first power control process for transmission to a first reception point and with a second power control process for transmission to a second reception point or to multiple reception points or with a use of a first ZC sequence or a second ZC sequence.

In yet another example, when not included in an SRS reference resource configuration field, an SRS transmission duration field, $n_{SRS}$, is also included in DCI format C. For example, $n_{SRS}$ can include 1 bit indicating SRS transmission either in slot symbols indicated by $k_{SRS}$ or also in previous slot symbols. This can be beneficial to improve channel estimation accuracy or timing estimation accuracy based on the SRS transmission as an effective signal-to-interference and noise ratio (SINR) at a reception point after combining the SRS reception over two symbols can be doubled. When an SRS transmission is over multiple slot symbols, it can be further modulated with an orthogonal covering code (OCC) in order to increase an SRS multiplexing capacity. For example, for SRS transmission over 2 slot symbols, when for a given SRS transmission BW a multiplexing capacity is N SRS transmissions per symbol, first N UEs can transmit N SRS in 2 slot symbols by applying an OCC of {1, 1} and second N UEs can transmit N SRS in same 2 slot symbols by applying an OCC of {1, −1}. At a reception point, SRS combining for each UE can be according to a respective OCC. A length of an OCC used by a UE can be equal to a number of the slot symbols with SRS transmission from the UE. An OCC can be associated with an SRS-RNTI by configuration or can be explicitly indicated in DCI format C. When an OCC is not used and the SRS transmission BW is smaller than an UL BW where SRS transmissions can occur, at least two SRS transmissions in two slot symbols can be with frequency hopping and occur in different parts of the UL BW.

In yet another example, DCI format C can also include a cell index (carrier index) for SRS transmissions.

Figure 17:
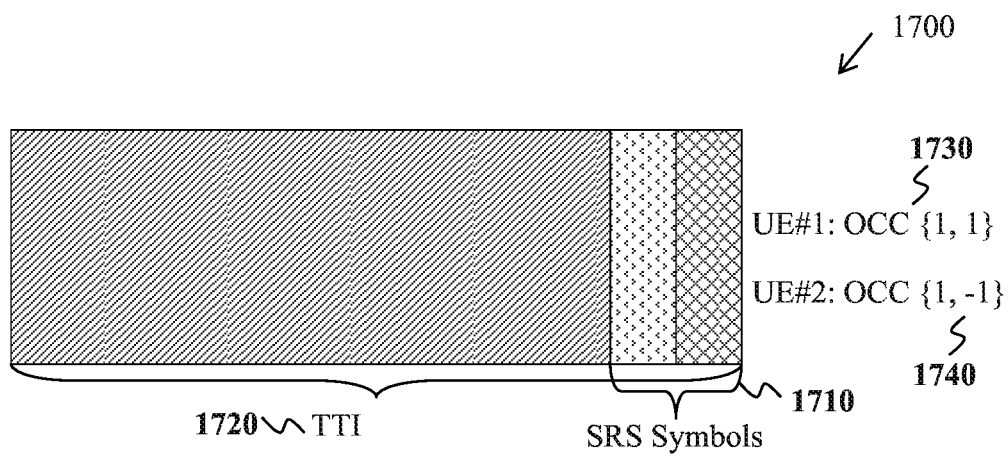
FIG. 17 illustrates an example application of an OCC for an SRS transmission according to embodiments of the present disclosure.

FIG. 17 illustrates an example application 1700 of an OCC for an SRS transmission according to embodiments of the present disclosure. An embodiment of the application 1700 of an OCC for an SRS transmission shown in FIG. 17 is for illustration only. Other embodiments may be used without departing from the scope of the present disclosure.

A first UE transmits a first SRS over two slot symbols 1710 of a slot 1720. The first UE transmits the first SRS over a BW starting from a RB and using a comb and a cyclic shift. The first UE applies an OCC of {1 1} to the first SRS over the two slot symbols 1730. A second UE transmits a second SRS over the two symbols of the slot. The second UE transmits the second SRS over the BW starting from the RB and using the comb and the cyclic shift (that is, with same parameters as the first SRS). The second UE applies an OCC of {1 −1} to the second SRS over the two slot symbols 1740. As the SRS combining at a gNB can be after a cyclic shift is restored, it is also possible to apply comb hopping or cyclic shift hopping between the SRS transmissions over the two slot symbols.

SRS transmission can be punctured in predetermined parts of a BW. For example, for a TDD system and in a slot that is an UL slot in a first cell and a DL slot in a second cell, SRS transmission in the first cell can be punctured in some parts of the BW in order to avoid creating interference to DL transmissions in the second cell or to avoid experiencing interference from DL transmissions in the second cell. For example, with FDM-based inter-cell interference coordination (ICIC), DL transmissions in some parts of a BW are with reduced power in a first cell in order to avoid interference in the parts of the BW to DL transmissions in a second cell that can be with increased power in order to serve cell-edge UEs. Even though an UL transmission power is typically smaller than a DL transmission power, for small cell deployments the power difference can be small or non-existent. A clustered SRS transmission from a UE avoids being practically continuous over a system BW while concentrating SRS transmission power in the parts of the BW where SRS reception by a gNB is useful and where the UE is likely to be scheduled DL transmissions or UL transmissions.

When data transmission from a UE is based on OFDM and does not have a single-carrier property, data transmission and SRS transmission can be multiplexed in a same slot symbol. For example, data can be transmitted in a first comb and SRS can be transmitted in a second comb. As a UE cannot know whether or not the first comb is used for SRS transmissions from other UEs, the UE can either be configured by higher layers whether or not to multiplex data in the first comb when the UE transmits SRS in the second comb or the UE can be explicitly indicated whether or not to multiplex data in the first comb through a field in a DCI format scheduling the PUSCH transmission from the UE. For example, a 1 bit field can indicate whether or not a UE multiplexes data in a first comb of a slot symbol where the UE transmits SRS.

DMRS transmission can also be based on a comb structure. DMRS and SRS multiplexing can then occur on a same slot symbol where DMRS transmission occupies a first comb and SRS transmission occupies a second comb. The DMRS transmission comb or the SRS transmission comb can be predetermined in the system operation and need not be signaled. A slot symbols indicated for SRS transmission can be limited to be among the slot symbols used for DMRS transmission.

Figure 18:
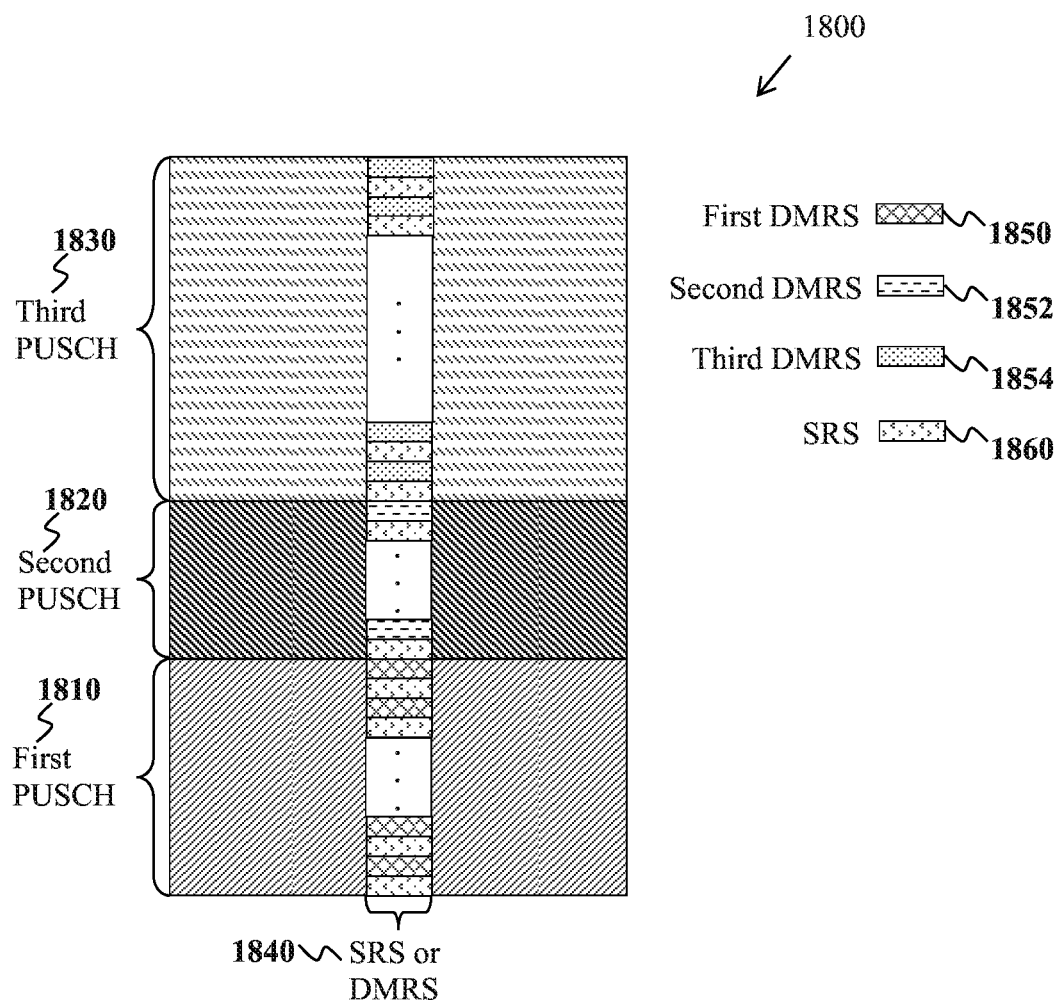
FIG. 18 illustrates an example multiplexing of DMRS transmissions and of SRS transmissions in a slot according to embodiments of the present disclosure.

FIG. 18 illustrates an example multiplexing 1800 of DMRS transmissions and of SRS transmissions in a slot according to embodiments of the present disclosure. An embodiment of the multiplexing 1800 of DMRS transmissions and of SRS transmissions in a slot shown in FIG. 18 is for illustration only. Other embodiments may be used without departing from the scope of the present disclosure.

A first UE transmits a first PUSCH over a first BW and over a number of symbols 1810, a second UE transmits a second PUSCH over a second BW and over the number of symbols 1820, and a third UE transmits a third PUSCH over a third BW and over the number of symbols 1830. One symbol from the number of symbols is used for SRS or DMRS transmissions 1840. Each UE multiplexes a DMRS transmission in one of the number of symbols over a respective PUSCH transmission BW using SCs of a second comb 1850, 1852, and 1854. Other UEs, that can include the first UE or the second UE or the third UE, multiplex SRS transmissions over an SRS transmission BW, including disjoint SRS transmission BWs for different UEs, using SCs of a first comb 1860. Although FIG. 18 considers one symbol for SRS or DMRS transmission, more symbols can also be used.

A UE having an RRC connection with a gNB and performing a random access process, such as for example contention-free random access as triggered by a PDCCH order, can benefit for subsequent UL scheduling and, for a TDD system, for subsequent DL scheduling when the UE can also transmit an SRS. An UL grant conveyed to a UE in a random access response (RAR) message, that a gNB transmits in response to a detection of a random access preamble transmission from the UE, can include SRS triggering information. The SRS transmission can be in a same slot as a slot indicated for a PUSCH transmission by the UE through an UL delay index in the UL grant of the RAR message. The slot symbol for SRS transmission can be included in the UL grant, for example as it was previously described using a field similar to the SRS reference resource configuration field in DCI format C, or can be a predetermined slot symbol such as a last one or more slot symbols. For a UE with RRC connection with the gNB, the SRS transmission parameters can be as previously configured to the UE by the gNB through higher layer signaling. For a UE without an RRC connection with the gNB, SRS transmission parameters can be provided by system information. Similar, an SRS transmission can be triggered by a PDCCH order for enabling a timing estimate at the gNB based on the SRS in addition to a random access preamble transmission in response to the PDCCH order from the UE.

In some embodiments, a DMRS design for transmission in a PDSCH and for transmission in a PUSCH is considered. Exemplary descriptions consider that the DMRS is based on ZC sequences. However, any orthogonal multiplexing of DL DMRS transmissions can UL DMRS transmissions can be applicable for the first embodiment of this disclosure.

DMRS locations in a slot can be same for transmission in a PDSCH and for transmission in a PUSCH. In this manner, for a synchronous TDD system, when a slot is used for DL transmissions in a first cell and the slot is used for UL transmissions in a second cell, respective DMRS can remain orthogonal in order to facilitate accurate channel estimation and enable improved reliability for interference cancellation.

In one example, DL DMRS transmissions and UL DMRS transmissions are located in same one or more slot symbols and use different combs (SCs). A comb can remain same or can be permuted in a predetermined manner among slot symbols with DMRS transmissions. For example, in case of 4 combs, DL DMRS can use first and third combs in respective first and second slot symbols, and UL DMRS can use second and fourth combs in respective first and second slot symbols. For example, in case of 4 combs, DL DMRS can use first and third comb in respective first and second slot symbols, and UL DMRS can use third and first combs in respective first and second slot symbols. For example, in case of 2 combs, DL DMRS can use a first comb in respective first and second slot symbols and UL DMRS can use a second comb in respective first and second slot symbols. A multiplexing of DL DMRS and of UL DMRS using different spectral combs is equivalent to frequency division multiplexing (FDM). For a RB that includes 12 SCs and for DMRS transmission in one of 4 combs, there are 3 SCs allocated to DL DMRS transmission or to UL DMRS transmission in a RB. One or more first symbols of a DL slot can also include DL control signaling. A first symbol of a UL slot can include only UL DMRS, which can be orthogonally multiplexed with DL DMRS or DCI, in order to protect DL control signaling from interference when an UL transmission power is comparable and/or similar to a DL transmission power. In case only UL DMRS is included in a slot symbol, a UE can compensate for SCs that are unavailable for UL DMRS transmission by boosting a UL DMRS transmission power by up to 6 dB assuming use of 1 SC every 4 SCs for UL DMRS transmission.

Figure 19:
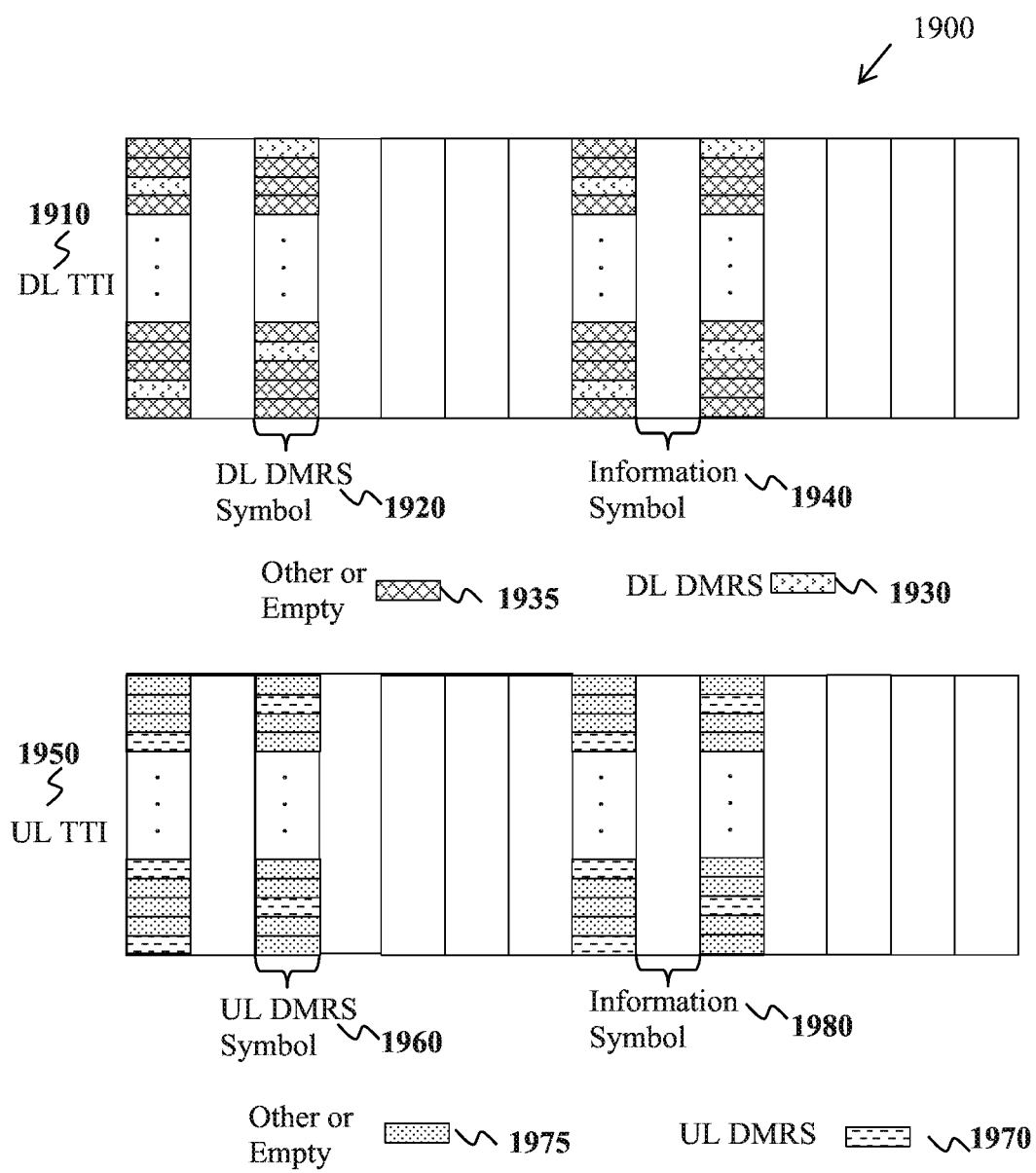
FIG. 19 illustrates an example DL DMRS transmission in a DL slot and UL DMRS transmission in an UL slot using different combs according to embodiments of the present disclosure.

FIG. 19 illustrates an example DL DMRS transmission 1900 in a DL slot and UL DMRS transmission in an UL slot using different combs according to embodiments of the present disclosure. An embodiment of the DL DMRS transmission 1900 in a DL slot and UL DMRS transmission in an UL slot using different combs shown in FIG. 19 is for illustration only. Other embodiments may be used without departing from the scope of the present disclosure.

A DL slot 1910 includes 14 symbols. DL DMRS is transmitted in a first, third, eighth, and tenth slot symbols 1920. DL DMRS in the first and eight symbols can be used for PDCCH reception while DL DMRS in the third and tenth slot symbols can be used for PDSCH reception. DL DMRS is transmitted every four SCs starting from a second SC in the first and eighth slot symbols and from a fourth SC in the third and tenth slot symbols 1930. Remaining SCs in slot symbols with DL DMRS transmission can be used for transmission of control information, such as for example in the first slot symbol, or data information, or other signaling, or can remain empty of transmissions in at least some slot symbols 1935. Remaining slot symbols 1940 in a DL slot can be used for transmission of control information, data information, or for other information or signaling types. An UL slot 1950 also includes 14 symbols. UL DMRS is transmitted in same slot symbols as DL DMRS 1960. UL DMRS is transmitted every four SCs starting from a first SC in the first and eighth slot symbols and from a third SC in the third and tenth slot symbols 1970. Remaining SCs in slot symbols with UL DMRS transmission can be used for transmission of control information, or data information, or other signaling types, or can remain empty of transmissions in at least some slot symbols 1975. Remaining slot symbols 1980 in an UL slot can be used for transmission of control information, data information, or for other information or signaling types.

The structure as shown in FIG. 19 is only for exemplary purposes and other structures can also be used. For example, the slot can include 7 symbols. For example, there can be two combs instead of four combs available for DMRS transmission, DL DMRS or UL DMRS can be transmitted in more or less slot symbols than in FIG. 19, and a location of slot symbols with DL DMRS transmission and UL DMRS transmission can be different than in FIG. 19.

Figure 20:
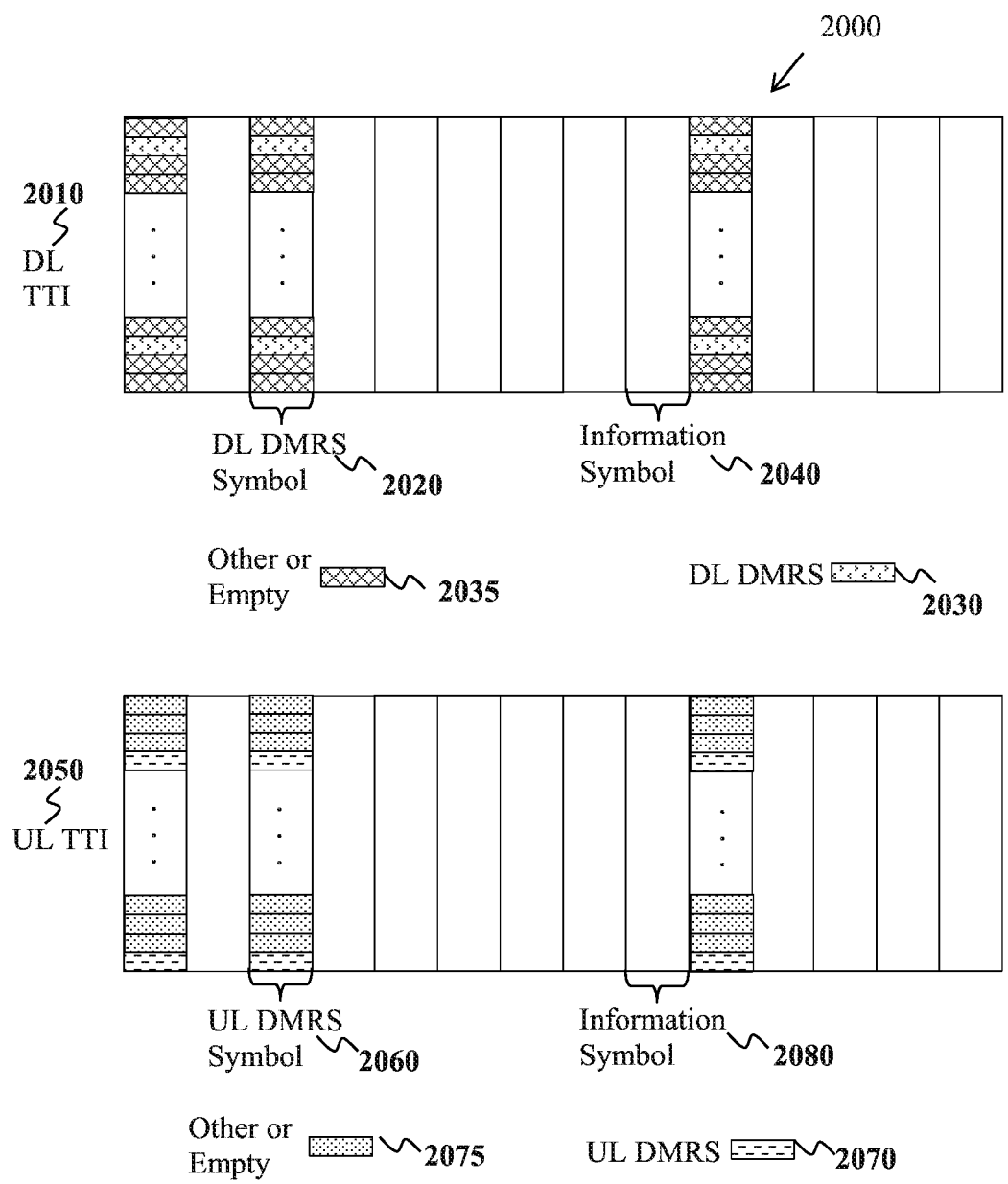
FIG. 20 illustrates another example DL DMRS transmission in a DL slot and UL DMRS transmission in an UL slot using different combs according to embodiments of the present disclosure.

FIG. 20 illustrates another example DL DMRS transmission 2000 in a DL slot and UL DMRS transmission in an UL slot using different combs according to embodiments of the present disclosure. An embodiment of the DL DMRS transmission 2000 in a DL slot and UL DMRS transmission in an UL slot using different combs shown in FIG. 20 is for illustration only. Other embodiments may be used without departing from the scope of the present disclosure.

A DL slot 2010 includes 14 symbols. DL DMRS is transmitted in a first, third, and tenth slot symbols 2020. DL DMRS is transmitted in a third SC every four SCs 2030. Remaining SCs in slot symbols with DL DMRS transmission can be used for transmission of control information, such as for example in the first slot symbol, or data information, or other signaling, or can remain empty of transmissions in at least some slot symbols 2035. Remaining slot symbols 2040 in a DL slot can be used for transmission of control information, data information, or for other information or signaling types. DL DMRS in the first slot symbol can be associated with demodulation of control information while DMRS in the third and tenth slot symbols can be associated with demodulation of data information. An UL slot 2050 also includes 14 symbols. UL DMRS is transmitted in same slot symbols as a DL DMRS 2060. UL DMRS is transmitted every four SCs starting from a first SC 2070. Remaining SCs in slot symbols with UL DMRS transmission can be used for transmission of control information, or data information, or other signaling types, or can remain empty of transmissions in at least some slot symbols 2075. Remaining symbols 2080 in an UL slot can be used for transmission of control information, data information, or for other information or signaling types.

In another example, DL DMRS and UL DMRS are located in same slot symbols and use different cyclic shifts when DL DMRS transmission and UL DMRS transmission are based on ZC sequences. Orthogonal multiplexing of DL DMRS and UL DMRS is enabled only when the DL DMRS and the UL DMRS are transmitted over a same set of RBs. A cyclic shift value that a DMRS uses can remain same or can be permuted in a predetermined manner among slot symbols with DMRS transmissions. For example, in case of 6 cyclic shift values, DL DMRS can use first and fourth cyclic shift values in respective first and second slot symbols and UL DMRS can use third and sixth cyclic shift values in respective first and second slot symbols. For example, in case of 6 cyclic shift values, DL DMRS can use first and fourth cyclic shift values in respective first and second slot symbols and UL DMRS can use fourth and first cyclic shift values in respective first and second slot symbols. A multiplexing of DL DMRS and of UL DMRS using different cyclic shift values is equivalent to code division multiplexing (CDM).

In yet another example, the aforementioned examples can apply where DL DMRS and UL DMRS are located in same slot symbols and use both different combs and different cyclic shifts.

A slot can also be a hybrid slot, having a configuration of DL symbols, GP symbols, and UL symbols. DL DMRS is not transmitted in UL slot symbols or GP symbols and UL DMRS is not transmitted in DL slot symbols.

To enhance a UE multiplexing capacity, in addition to FDM of DMRS through a use of different spectral combs and CDM of DMRS through a use of different cyclic shifts of a ZC sequence, CDM through a use of different orthogonal covering codes (OCCs) for DMRS transmission in respective slot symbols or spectral combs of an slot symbol can also apply. For example, different OCCs can be assigned to different UEs when a response of a channel medium remains materially same among respective slot symbols used for DMRS transmission when DMRS is transmitted in more than one slot symbols. Different OCCs can also apply for DL DMRS transmissions and UL DMRS transmissions. OCC can be used in a frequency domain, for example when same spectral combs are used for DMRS transmission to or from different UEs. For example, when a channel experienced by 2 UEs is materially same between 2 spectral combs, an OCC of length 2 can apply where a DMRS transmission in 2 successive spectral combs to or from a first UE is modulated by {1, 1} and a DMRS transmission in same 2 successive spectral combs to or from a second UE by {1, −1}.

A cyclic shift value or a comb value or an OCC for a DMRS transmission to a UE in a PDSCH or from the UE in a PUSCH can be signaled in a DCI format scheduling the respective PDSCH transmission or PUSCH transmission. The DCI format can include individual fields indicating, when applicable, a comb, a cyclic shift, or an OCC or can include a single field providing a combined mapping to each applicable comb, cyclic shift, or OCC.

Table 5 summarizes an exemplary mapping of the following DCI format fields configuring on ore more parameters for a DMRS transmission in a PDSCH or in a PUSCH including: (1) "cyclic shift" field that includes 2 bits and indicates a cyclic shift value, (2) "comb" field that includes 1 bit and indicates a spectral comb, and (3) "OCC" field that includes 1 bit and indicates an OCC. It is assumed that a DMRS is transmitted every 2 SCs in a slot symbol. A DMRS can also be transmitted every number of SCs that is different than 2. Then, a number of bits for the "cyclic shift" field can decrease and a number of bits for the "comb" field can increase. For example, when a DMRS is transmitted every 4 SCs, the "cyclic shift" field can include 1 bit and the "comb" field can include 2 bits. For example, when a DMRS is transmitted every 8 SCs, the "cyclic shift" field can be omitted and the "comb" field can include 3 bits. It is also possible to have only a "DMRS parameters" field where a value of the field maps to a cyclic shift value, a comb value, and an OCC for a DMRS transmission. A "DMRS parameters" field of 4 bits can capture all combinations in Table 5 and a subset of combinations can be captured by a smaller number of bits. When DMRS transmission is not based on ZC sequences, an indication of a cyclic shift is not needed.

TABLE 5

Mapping of "DMRS parameters" field to DMRS transmission parameters

| Value | Cyclic Shift, Comb, OCC | Value | Cyclic Shift, Comb, OCC |
| --- | --- | --- | --- |
| 00, 0, 0 | 0, 0, {1, 1} | 00, 0, 0 | 0, 0, {1, −1} |
| 01, 0, 0 | 3, 0, {1, 1} | 01, 0, 0 | 3, 0, {1, −1} |
| 10, 0, 0 | 6, 0, {1, 1} | 10, 0, 0 | 6, 0, {1, −1} |
| 11, 0, 0 | 9, 0, {1, 1} | 11, 0, 0 | 9, 0, {1, −1} |
| 00, 1, 0 | 0, 1, {1, 1} | 00, 1, 0 | 0, 1, {1, −1} |
| 01, 1, 0 | 3, 1, {1, 1} | 01, 1, 0 | 3, 1, {1, −1} |
| 10, 1, 0 | 6, 1, {1, 1} | 10, 1, 0 | 6, 1, {1, −1} |
| 11, 1, 0 | 9, 1, {1, 1} | 11, 1, 0 | 9, 1, {1, −1} |

In some embodiments, a CSI-RS design and an SRS design are considered. The CSI-RS and the SRS are based on ZC sequences. CSI-RS transmission includes zero-power CSI-RS.

In one example, at least some CSI-RS locations in a DL slot or some SRS locations in an UL slot can be same as DL DMRS locations in the DL slot or as UL DMRS locations in the UL slot, respectively. CSI-RS transmissions from different antenna ports are over a same BW and can be orthogonally multiplexed in a CDM manner using different cyclic shifts of a same ZC sequence. For example, for two combs, there can be four or eight cyclic shift for CDM of CSI-RS transmissions from different antenna ports per comb. DL DMRS transmission can be on a first comb and CSI-RS transmission can be on a second comb. Similar, SRS transmissions from different antenna ports are over a same BW and can be orthogonally multiplexed in a CDM manner using different cyclic shifts of a same ZC sequence. For example, for two combs, there can be four or eight cyclic shift for CDM of SRS transmissions from different antenna ports. UL DMRS transmission can be on a first comb and SRS transmission can be on a second comb. For four combs, DL DMRS, CSI-RS, UL DMRS and SRS transmissions can each be allocated in different combs in a same DL slot or UL slot symbol, respectively. In this manner, resource overhead from CSI-RS transmissions or from SRS transmissions can be reduced and a same slot symbol can support both DL DMRS and CSI-RS transmissions in the DL or both UL DMRS and SRS transmissions in the UL. It is also possible to not use ZC sequences and rely on orthogonal multiplexing on a FDM manner using different combs/SCs in the frequency domain. Orthogonal multiplexing among different RS types or, for a same RS type, among different antennas using different OCCs in the time domain or the frequency domain can also apply as it was previously described.

Figure 21:
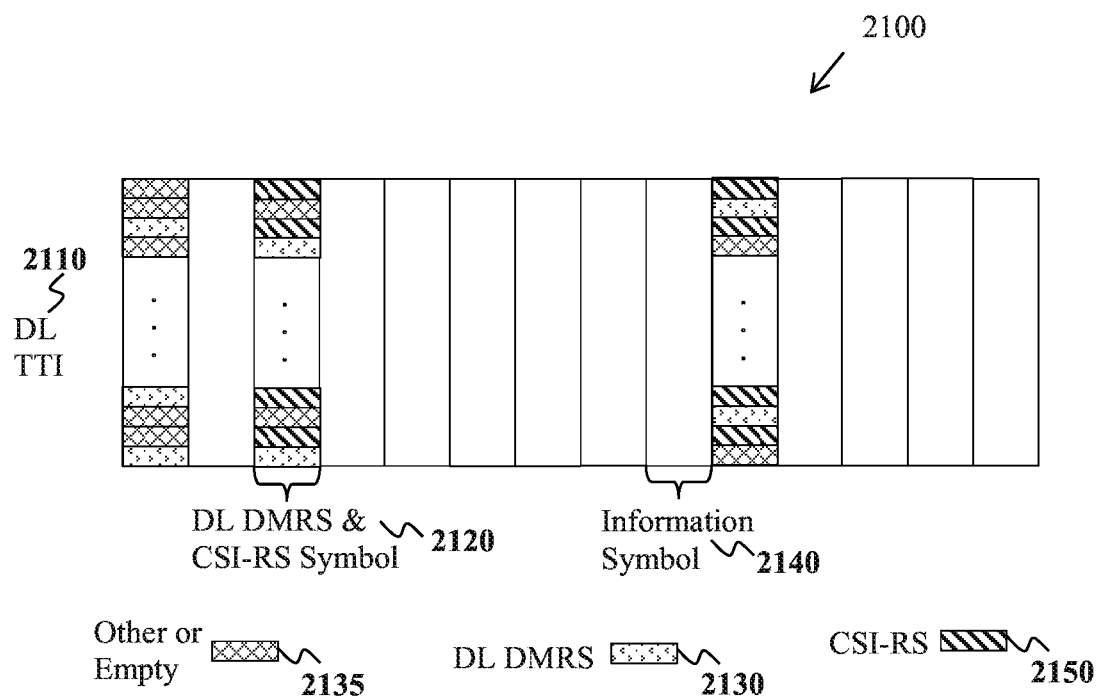
FIG. 21 illustrates an example CSI-RS transmission in a DL slot according to embodiments of the present disclosure.

FIG. 21 illustrates an example CSI-RS transmission 2100 in a DL slot according to embodiments of the present disclosure. An embodiment of the CSI-RS transmission 2100 in a DL slot shown in FIG. 21 is for illustration only. Other embodiments may be used without departing from the scope of the present disclosure.

A DL slot 2110 includes 14 symbols. DL DMRS is transmitted in first, third, and tenth slot symbols 2120. DL DMRS in the first slot symbol can be associated with demodulation of control information and DL DMRS in the third and tenth slot symbols can be associated with demodulation of data information. The DL DMRS structure in the first slot symbol can be different than the DL DMRS structure in the third and tenth slot symbols. For example, the DL DMRS in the first slot symbol can be transmitted every three SCs 2130 while the DL DMRS in the third and tenth slot symbols can be transmitted every four SCs starting from a first SC in the third symbol and from a third SC in the tenth symbol. Remaining SCs in slot symbols with DL DMRS transmission or CSI-RS transmission can be used for transmission of control information, such as for example in the first slot symbol, or data information, or other signaling, or can remain empty of transmissions in at least some slot symbols 2135. SCs not used for any transmission can be associated with a zero-power CSI-RS configuration. Remaining symbols 2140 in a DL slot can be used for transmission of control information, data information, or for other information or signaling types. CSI-RS is transmitted in third and tenth slot symbols. CSI-RS is transmitted every two SCs starting from a second SC 2150. CSI-RS transmission from different antenna ports can be in different slot symbols or in a same slot symbol using different cyclic shifts of a same ZC sequence. For example, when CSI-RS transmission is from two antenna ports, CSI-RS is transmitted from each antenna port on both third and tenth slot symbols using different cyclic shifts of a same ZC sequence. For example, when CSI-RS transmission is from eight antenna ports, CSI-RS is transmitted from first four antenna ports in the third slot symbol using different cyclic shifts of a same ZC sequence and CSI-RS is transmitted from last four antenna ports in the tenth slot symbol using different cyclic shifts of a same ZC sequence.

CSI-RS can also be orthogonally multiplexed in a same slot symbol with a wideband DL DMRS using different cyclic shifts of a same ZC sequence or using an OCC among SCs in the slot symbol. For example, as shown in FIG. 21, a CSI-RS can be multiplexed using different cyclic shifts of a same ZC sequence with a DL DMRS transmitted in the first slot symbol and used, for example, for demodulation of control information. For example, a DL DMRS can use OCC {1, 1} in successive SC pairs and a CSI-RS can use OCC {1, −1} in successive SC pairs In this manner, additional resources for CSI-RS transmission are avoided although, for a synchronous network, interference on the DL DMRS or on the CSI-RS is increased in slots where neighboring gNBs also transmit CSI-RS in a same slot in respective cells. An OCC among CSI-RS transmissions in respective slot symbols can also apply.

SRS transmissions can follow a same multiplexing principle with UL DMRS transmissions in an UL slot as the multiplexing principle of CSI-RS transmissions with DL DMRS transmissions in a DL slot. In one example, empty SCs in slot symbols used for CSI-RS transmissions can be used to multiplex SRS transmissions (FDM). In this manner, interference is avoided among CSI-RS transmissions and SRS transmissions in a TDD system where a slot is a DL slot in a first cell and the slot is an UL slot in a second cell. CSI-RS transmission power can be increased due to empty SCs in a respective slot symbol.

DMRS utilization is typically dictated by a tradeoff between an amount of resources allocated to DMRS transmission and estimation accuracy for a parameter, such as a channel medium or a noise variance. In general, the larger the amount of resources is, the better the estimation accuracy for the parameter is. However, the larger the amount of resources allocated to DMRS transmission, the smaller the amount of remaining resources that can be allocated to data transmission and therefore the smaller the system spectral efficiency. Therefore, it is beneficial to dimension an amount of resources allocated to DMRS transmission or to utilize allocated resources so that to improve a tradeoff between estimation accuracy for associated parameters using the DMRS and amount of resources allocated to DMRS transmission.

In one example, a DMRS used for demodulation of control information can also be used for demodulation of data information. When a transmission scheme used for control information is same as a transmission scheme used for data information, precoding of respective DMRS can be same or can be related in a predetermined manner. For example, when a UE detects control information assuming a first transmit diversity scheme and first precoding for an associated first DMRS and the control information schedules transmission of data information to the UE with a second transmit diversity scheme and second precoding for an associated second DMRS, the UE can use both first DMRS and second DMRS for demodulating the data symbols. The first transmission scheme can be same or different than the second transmission scheme and the first precoding can be same or different than the second precoding and, in the latter case, there can be a predetermined relation between the first precoding and the second precoding. For example, each RE can be associated with one out of two antenna ports in an alternating manner starting from a first antenna port. For example, for space-frequency block coding (slotBC) transmit diversity with two antenna ports, an output of $y(i)=[y^{(0)}(i)\ y^{(1)}(i)]^T$ of a precoding operation is defined by:

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} Re(x^{(0)}(i)) \\ Re(x^{(1)}(i)) \\ Im(x^{(0)}(i)) \\ Im(x^{(1)}(i)) \end{bmatrix} \text{ for } i = 0, 1, \ldots, M_{symb}^{layer} - 1$$

where $M_{symb}^{layer}$ is a number of modulation symbols per layer and $M_{symb}^{ap} = 2 M_{symb}^{layer}$.

For brevity, following descriptions are with respect the DL DMRS transmission but similar principles can apply for UL DMRS transmissions.

Figure 22:
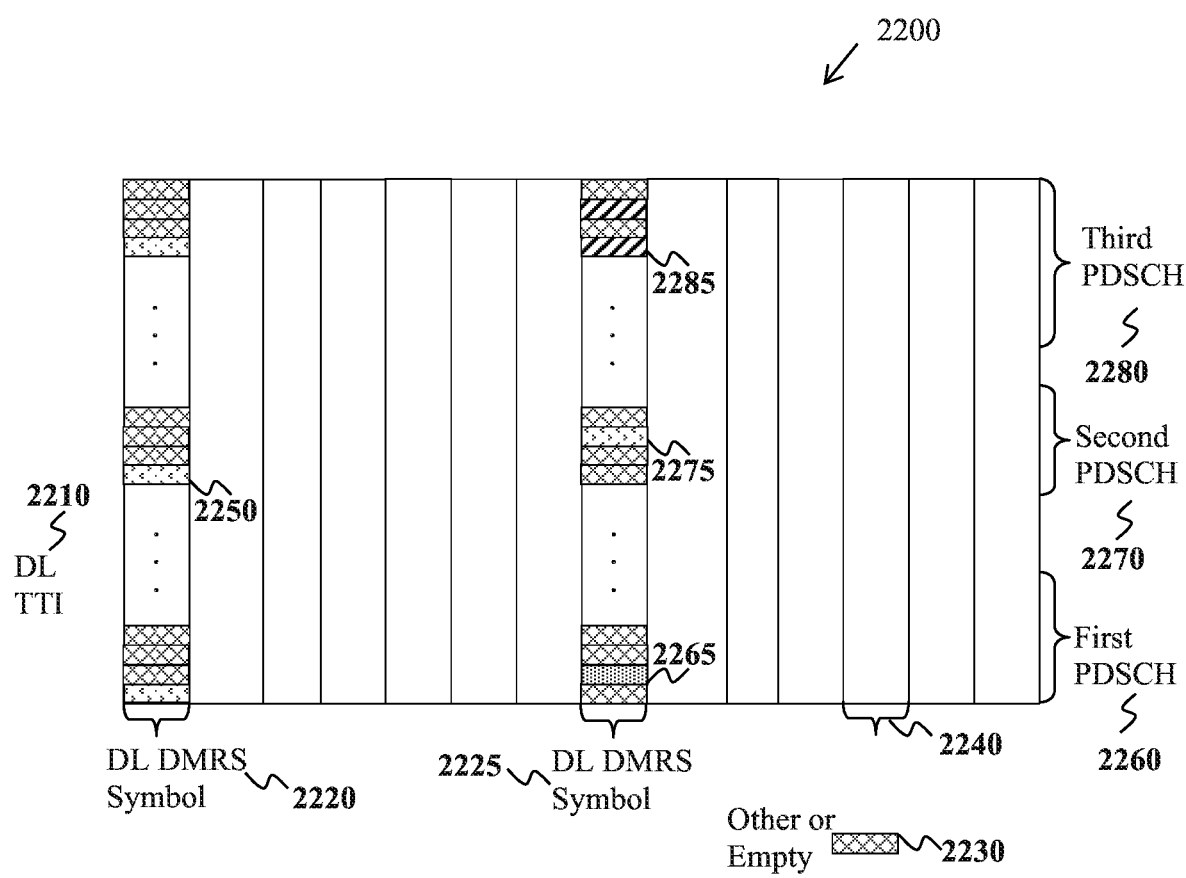
FIG. 22 illustrates an example use of a first DL DMRS associated with transmission of control information and of a second DL DMRS associated with transmission of data information for demodulation of data symbols according to embodiments of the present disclosure.

FIG. 22 illustrates an example use of a first DL DMRS 2200 associated with transmission of control information and of a second DL DMRS associated with transmission of data information for demodulation of data symbols according to embodiments of the present disclosure. An embodiment of the use of a first DL DMRS 2200 associated with transmission of control information and of a second DL DMRS associated with transmission of data information for demodulation of data symbols shown in FIG. 22 is for illustration only. Other embodiments may be used without departing from the scope of the present disclosure.

A DL slot 210 includes 14 symbols. DL DMRS is transmitted in first and eighth slot symbols 220 and 2225. SCs that are not used for DL DMRS transmission can be used for transmission of DCI, such as for example in first slot symbols, or data information, or other signaling, or can remain empty of transmissions in at least some slot symbols 230. Remaining slot symbols 2240 can be used for transmission of data information or for other information or signaling types. DL DMRS in the first slot symbol can be associated with PDCCH transmissions, can be transmitted, for example, every four SCs starting from a first SC over a BW, including all system BW, and have a precoding 2250 for each antenna port. DL DMRS associated with a PDSCH is transmitted only within an associated transmission BW for the PDSCH and a UE does not assume a same precoding for DL DMRS transmission from an antenna port outside a respective PDSCH transmission BW.

For a first PDSCH transmission over a first BW 2260 that uses a transmission scheme other than transmit diversity, such as for example a multi-layer transmission scheme based on spatial beam-forming, DL DMRS is transmitted every four SCs starting from a second SC of the first BW, has a precoding 2265 for each antenna port, and a UE does not assume the precoding 2265 is same as the precoding 2250 for each respective antenna port. A frequency domain density and location of the DL DMRS associated with the first PDSCH transmission can be different than a frequency domain density and location of the DL DMRS associated with PDCCH transmissions.

For a second PDSCH transmission over a second BW 2270 that uses a transmit diversity scheme, DL DMRS is transmitted every four SCs starting from a third SC of the second BW, has a precoding for each of the antenna ports 2275, and a UE can assume that the precoding for the DL DMRS associated with the second PDSCH is same as the precoding 2250 for the DL DMRS associated with a PDCCH scheduling the second PDSCH for each respective antenna port.

For a third PDSCH transmission over a third BW 2280 that uses a transmission scheme other than transmit diversity, DL DMRS is transmitted every two SCs starting from a first SC of the third BW, has a precoding 2285 for an antenna port, and a UE does not assume that the precoding 2285 is same as the precoding 2250 for the antenna port. When a UE receives a PDSCH based on a transmit diversity scheme that is scheduled by a PDCCH that is also based on a transmit diversity scheme and the UE assumes that, for an antenna port, a precoding for a first DMRS transmitted in a BW for PDCCH transmissions to a number of UEs is same as a precoding for a second DMRS transmitted in a BW for PDSCH transmission to the UE, the UE can include both the first DMRS and the second DMRS in an estimation of a channel medium used the UE uses to demodulate the PDSCH, thereby improving a demodulation accuracy due to an improved channel estimation or noise variance estimation accuracy.

Using both a DMRS associated with demodulation of UL data information and a DMRS associated with demodulation of UCI can also apply. For example when a UE transmits PUSCH and PUCCH from a single antenna or when a UE transmits PUSCH and PUCCH using transmit antenna diversity, a system operation can specify that the UE applies a same precoding to an UL DMRS associated with a PUSCH transmission and to an UL DMRS associated with a PUCCH transmission. For example, a similar structure as in FIG. 22 can apply where PUSCHs are transmitted instead of PDSCH and transmission of UCI in PUCCH is in last slot symbols instead of first slot symbols for DCI transmission in PDCCH in FIG. 22. Similar, when a UE transmits a PUSCH using a single antenna port or using transmit diversity, such as antenna selection diversity, and transmits SRS from a respective antenna port, a system operation can specify that the UE uses a same precoding for the DMRS associated with the PUSCH as for the SRS. The same principle can be extended to PUSCH with transmit diversity and to SRS transmission from multiple antenna ports.

In another example, a DMRS density can be adjusted per slot. For brevity, descriptions are with respect to DL DMRS transmissions but similar principles apply for UL DMRS transmissions associated with a PUSCH or a PUCCH. A DL DMRS structure associated with a PDSCH transmission can be explicitly or implicitly indicated among a finite set of DL DMRS structures. A gNB can configure a UE whether or not a DMRS structure is adapted.

An explicit indication of a DL DMRS structure can be through a DL DMRS structure field in a DCI format scheduling a PDSCH transmission or in an RRC signaling configuring a PDSCH transmission. For example, a DL DMRS structure field that includes one bit can indicate one out of two predetermined or preconfigured DL DMRS structures. For example, a first DL DMRS structure can be used with operation with small SINRs, such as below −3 dB, to improve channel estimation accuracy. A first DL DMRS structure can also be used with large SINRs, such as above 18 dB, to improve noise variance estimation accuracy that can be used for determining log-likelihood ratios in case of large modulation orders such as 64 QAM or 256 QAM. An association of a DMRS structure and a SINR can also be through a value of an MCS field signaled in a DCI format scheduling a PDSCH transmission (or a PUSCH transmission for an UL DMRS). For example, an MCS below a configured MCS or an MCS above a configured MCS can be associated with a first DMRS structure. A first DL DMRS structure can also be used in case of large Doppler shift, associated with large UE velocities for a given carrier frequency, to improve channel estimation accuracy across a PDSCH slot. A second DL DMRS structure can be used for other SINRs or for Doppler shifts that are not large. For example, for a slot that includes seven symbols and for a same frequency domain density of a DL DMRS per respective symbol, a first DL DMRS structure can include DL DMRS transmission in two slot symbols, such as a third slot symbol and a seventh slot symbol, while a second DL DMRS structure can include DL DMRS transmission in one slot symbol, such as a third slot symbol. For example, for a same time domain density for a DL DMRS per slot, a first DL DMRS structure can include DL DMRS transmission every 2 SCs in respective slot symbols while a second DL DMRS structure can include DL DMRS transmission every 4 SCs in respective slot symbols.

In addition to a time domain, a DL DMRS structure can be adaptive in a frequency domain in order to reflect a frequency selectivity of a channel medium. For a frequency selective channel, such as a channel with material multipath propagation, a DL DMRS structure can be more dense in the frequency domain while for a less frequency selective channel, such as a channel without material multipath propagation, a DL DMRS structure can be less dense (more sparse) in the frequency domain. For example, a first DL DMRS structure can correspond to DL DMRS transmission from an antenna port every 3 SCs while a second DL DMRS structure can correspond to DL DMRS transmission from an antenna port every 6 SCs. An explicit indication of a DL DMRS structure in a frequency domain, from a set of two DL DMRS structures, can be by a DL DMRS structure field that includes one bit. A DL DMRS time structure field and a DL DMRS frequency structure field can be included in a DCI format scheduling a PDSCH transmission or a DL DMRS structure field can indicate both a structure in a time domain and a structure in a frequency domain for a DL DMRS associated with a PDSCH transmission.

For example, a DL DMRS structure field of 2 bits can indicate one of four DL DMRS structures where at least two of the four DL DMRS structures have different characteristics in a time domain and in a frequency domain. An indication of a DL DMRS structure by a DCI format scheduling a PDSCH transmission can also enable an adjustment of a number of spatially multiplexed PDSCH transmissions to different UEs where a larger number of spatial multiplexed PDSCH transmissions can be supported by a DL DMRS structure using a larger number of SCs in a slot.

Figure 23:
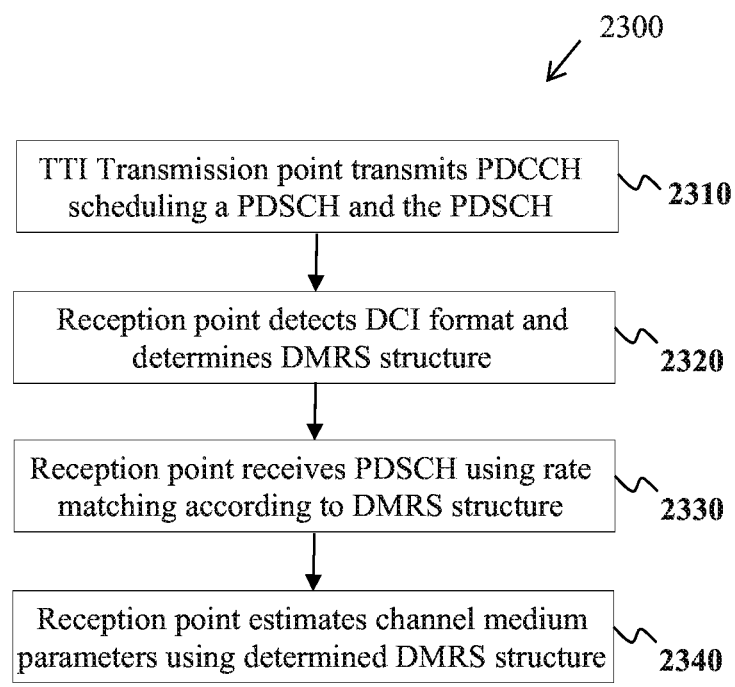
FIG. 23 illustrates an example determination method of a DMRS transmission structure according to embodiments of the present disclosure.

FIG. 23 illustrates an example determination method 2300 of a DMRS transmission structure according to embodiments of the present disclosure. An embodiment of the determination method 2300 of a DMRS transmission structure shown in FIG. 23 is for illustration only. Other embodiments may be used without departing from the scope of the present disclosure.

In step 2310, a transmission point, such as a gNB, transmits a PDCCH that includes a DCI format scheduling a PDSCH transmission to a reception point such as a UE. The DCI format includes a DMRS structure field than indicates a DMRS structure in a time domain or in a frequency domain. The reception point detects the PDCCH and determines the DMRS structure in step 2320. The reception point receives the PDSCH by performing a rate matching over a slot according to the determined DMRS structure in step 2330. The reception point uses the determined DMRS structure to estimate parameters of a channel medium and demodulate data symbols in the received PDSCH in step 2340. An indication of a DMRS structure can also be provided to a reception point by higher layer signaling that can be sufficient when, for example, the reception point experiences channel characteristics that materially vary over a substantially longer time period than a PDSCH slot.

In a first realization, an implicit indication of a DL DMRS structure can be based on a MCS, corresponding to a spectral efficiency value, for data information in a PDSCH as determined by a DCI format scheduling the PDSCH. For UCI transmission by a UE in a PUCCH with a fixed modulation scheme, such as QPSK, the MCS is equivalent to a UCI coding rate that the UE determines from a ratio of a UCI payload (including CRC bits) over a total number of SCs for UCI multiplexing. When a MCS is equal to or lower than a first reference MCS (through respective spectral efficiency values) or equal to or larger than a second reference MCS, a first DMRS structure can be used; otherwise, a second DMRS structure can be used. The first DMRS structure can have a larger DMRS density per slot than the second DMRS structure. The reference MCS can be predetermined in a system operation or can be configured to a UE by UE-common or UE-specific RRC signaling.

In a second realization, an implicit indication of a DL DMRS structure during a PDSCH slot can be based on a size of resources allocated to transmissions other than PDSCH transmissions during the slot. For example, when there is CSI-RS transmission or when there is CSI-RS transmission occupying a number of resources above a predetermined or configured reference number of resources during a slot, a second DMRS structure with fewer DMRS resources can be used in the slot in order to increase a number of resources available for data transmission; otherwise, a first DMRS structure can be used. Similar, when a number of resources used for transmission of control signaling during a slot is above a reference number that is predetermined or configured to a UE by UE-common or UE-specific RRC signaling, a second DMRS structure can be used; otherwise, a first DMRS structure can be used.

In yet another example, a DMRS structure can be adapted based on a slot length (number of slots for a slot or number of slot symbols) of a PDSCH or of a PUSCH. For example, for a PDSCH transmission over two consecutive DL slots that is scheduled by a same DCI format, a number of SCs used for DMRS transmission can be smaller than a number of SCs used for two PDSCH transmissions that are scheduled by two separate DCI formats. A gNB can configure a UE whether or not a DMRS structure is adapted. For example, using RRC signaling of 1 bit, a gNB can configure a UE to assume either a same DMRS structure regardless of a number of slots for the slot or a DMRS structure with reduced SCs, in time or in frequency, for DMRS transmission per slot when the number of slots for the slot is larger than one.

An adaptability of a DMRS structure is limited in practice by several considerations including by limitations in a receiver implementation complexity. When a reception point is required to estimate a channel medium for multiple possible DMRS structures, there is an associated increase in an implementation complexity and in a testing complexity. Another dimension for adapting DMRS resources, other than adapting a number of SCs used for DMRS transmission per slot or per slot, is to adapt a DMRS transmission power. For example, for a DMRS structure per slot, when a scheduling unit determines that a number of SCs allocated to DMRS transmission in a PDSCH or a PUSCH is materially larger than or smaller than necessary, the scheduling unit can respectively decrease or increase a DMRS transmission power. A DCI format scheduling a PDSCH transmission to a UE or a PUSCH transmission from a UE can include a "DMRS power offset" field indicating an offset for a DMRS transmission power relative to a data transmission power.

For example, a "DMRS power offset" field can include 2 bits that indicate a +6 dB, +3 dB, 0 dB, or −3 dB adjustment in a DMRS transmission power relative to a data transmission power. For data reception in a PDSCH, signaling of a DMRS power offset can be used by a UE for demodulation of data symbols that are modulated using a QAM-based modulation. For data transmission in a PUSCH, signaling of a DMRS power offset can enable a UE to determine an increase or decrease in a DMRS transmission power relative to a transmission power for data symbols. When a UE is power limited and cannot increase a DMRS transmission power to a value indicated by a DCI format scheduling an associated PUSCH transmission, the UE increases a DMRS transmission power up to a maximum transmission power for the slot symbol.

Figure 24:
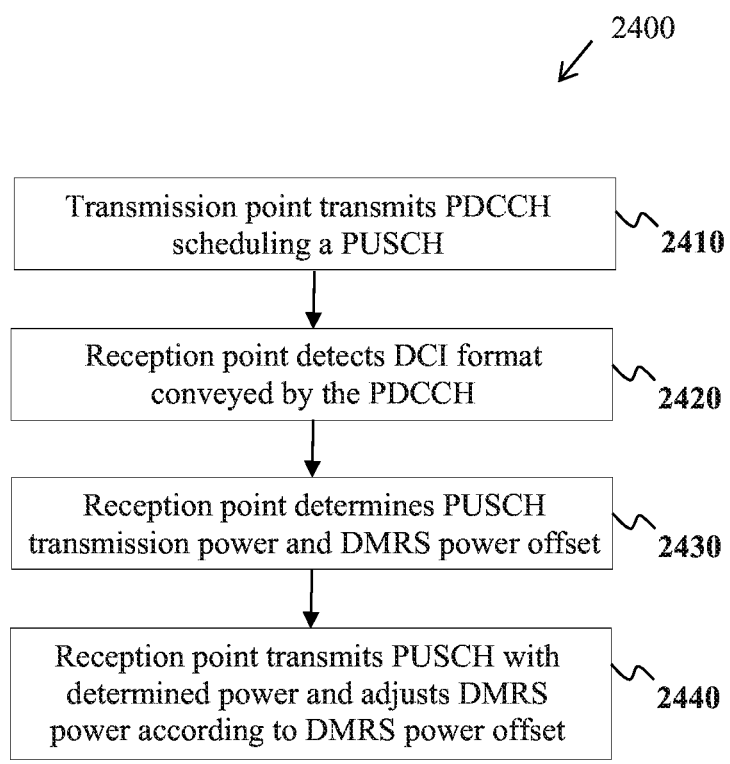
FIG. 24 illustrates an example determination method of a DMRS transmission power according to embodiments of the present disclosure.

FIG. 24 illustrates an example determination method 2400 of a DMRS transmission power according to embodiments of the present disclosure. An embodiment of the determination method 2400 of a DMRS transmission power shown in FIG. 24 is for illustration only. Other embodiments may be used without departing from the scope of the present disclosure.

In step 2410, a transmission point, such as a gNB, transmits a PDCCH that includes a DCI format scheduling a PUSCH transmission from a reception point such as a UE. The DCI format includes a "DMRS power offset" field that indicates an offset for a DMRS transmission power relative to a transmission power of data symbols in the PUSCH that is determined according to a power control process. The UE detects the DCI format conveyed by the PDCCH in step 2420. The UE determines a PUSCH transmission power and an offset for a DMRS transmission power based on the detected DCI format in step 2430. The UE transmits data symbols in the PUSCH with the determined transmission power and transmits the DMRS with a power computed by applying the power offset to the determined transmission power in step 2440. A same procedure can apply for a DCI format scheduling a PDSCH transmission to a UE where a "DMRS power offset" field can indicate an offset for a DMRS transmission power relative to a transmission power of data symbols in the PDSCH and the UE can demodulate the data symbols, for example for QAM-based modulation, using the DMRS power offset value.

When a UE maintains a same total transmission power per slot symbol for a PUSCH or a PUCCH, as determined through a power control process, the UE can increase or decrease a DMRS transmission power in a slot symbol according to a power offset and decrease or increase, respectively, a transmission power of data symbols in the slot symbol where the UE transmits both data symbols and DMRS so that the transmission power is same as in a slot symbol where the UE transmits only data symbols.

Figure 25:
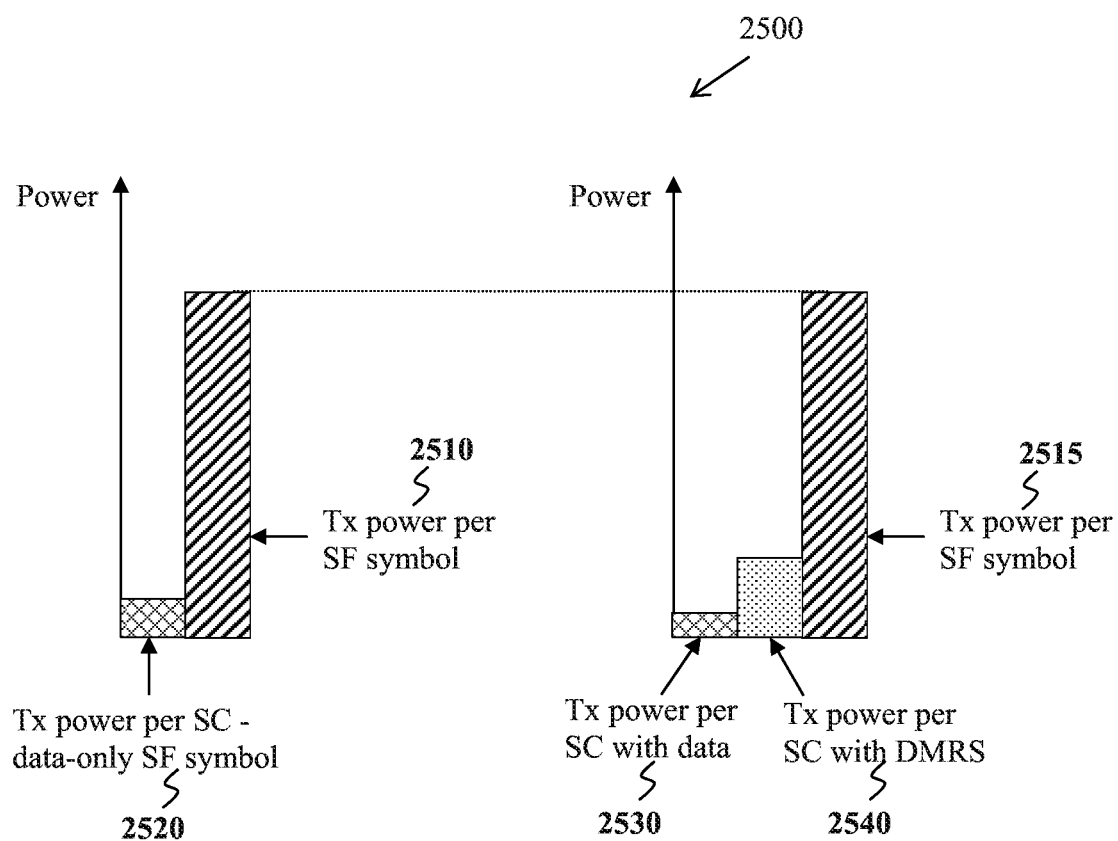
FIG. 25 illustrates an example transmission power of data symbols and DMRS symbols in slot symbols according to embodiments of the present disclosure.

FIG. 25 illustrates an example transmission power 2500 of data symbols and DMRS symbols in slot symbols according to embodiments of the present disclosure. An embodiment of the transmission power 2500 of data symbols and DMRS symbols in slot symbols shown in FIG. 25 is for illustration only. Other embodiments may be used without departing from the scope of the present disclosure.

A UE determines a transmission power for a PUSCH over a slot that includes slot symbols conveying only data symbols and slot symbols conveying both data symbols and DMRS symbols. A PUSCH transmission power is same in each slot symbol of a PUSCH transmission 2510, 2515. A transmission power per SC in a slot symbol with data-only transmission has a first value 2520. A transmission power per SC in a slot symbol with both data symbol transmission and DMRS symbol transmission depends on whether the SC is used to transmit a data symbol or a DMRS symbol. When a SC is used to transmit a data symbol, a transmission power has a second value 2530 that is smaller than the first value when a DMRS symbol transmission power is larger than a data symbol transmission power (positive DMRS power offset). A DMRS symbol transmission power 2540 is larger than the data symbol transmission power in a slot symbol with both data symbols and DMRS symbols.

Orthogonal DMRS multiplexing for DL transmissions and UL transmissions can facilitate cancellation of interference that can be experienced in a dynamic TDD operation where a slot type (e.g., DL, UL, or hybrid) can be independently selected in neighboring cells. For example, when a first cell uses a slot for DL transmissions and a neighboring cell uses the slot for UL transmissions, DL interference from the neighboring cell can have a much larger power than a received power of UL transmissions on the first cell. In general, when in any part of a slot an UL transmission on a cell is interfered by DL transmissions on neighboring cells, a reception reliability for the UL transmission is compromised as a DL transmission power is typically materially larger than an UL transmission power and an associated DL interference strength is materially larger than an UL received signal strength.

Dynamic TDD operation can be enabled by a reception point estimating and subtracting DL interference from a received signal that includes UL transmission. For example, a receiver at a first cell can first estimate received interference from DL transmissions on other cells, subtract the estimated interference from a received signal, and then demodulate and decode received UL transmissions from one or UEs. A corresponding reception process can also apply at a UE receiver but this is typically less critical as UL interference is smaller than DL interference and reception reliability of DL transmission at a UE can often benefit from experiencing UL interference.

When a central scheduling entity schedules an UL transmission from a UE in a slot over a set of RBs on a first cell and schedules DL transmissions to UEs in the slot on a set of cells that a receiver at the first cell receives with larger power than the UL transmission from the UE in the slot over the set of RBs, the scheduling entity can inform the receiver at the first cell of the parameters, such as MCS, RB allocation, precoding, CSI-RS and DMRS signaling resources, and even the data or control information, for DL transmissions in the slot on the set of cells that interfere with the UL transmission from the UE. For example, a determination for the set of cells can be based on measurements of corresponding DL signaling, such as a CSI-RS, at the receiver of the first cell and can be informed to the scheduling entity. For example, a determination for the set of cells can be by the scheduling entity based on the location and the transmission power in the slot on neighboring cells to the first cell.

When parameters of DL transmissions that are received by a receiver of a first cell with larger power than UL transmissions on the first cell are available to the first cell, the first cell receiver can detect and cancel the interfering DL transmissions from the UL transmissions. The interference cancellation can also be performed at the location of the scheduling entity when backhaul capacity is large and backhaul latency is negligible compared to a time budget for processing received data information. One unknown parameter can be a channel medium experienced by the DL transmissions from the set of cells to the receiver of the first cell as the DL transmissions can be precoded according to channels and antenna configurations of intended UEs and can therefore vary even when transmission points and reception points are stationary.

DMRS multiplexing among DL transmissions and UL transmissions in same one or more slot symbols, where the multiplexing can also be orthogonal, can enable DMRS interference cancellation or interference avoidance and facilitate estimation and subtraction of interference from a strongest DL transmission on a first interfering cell, followed by interference estimation and subtraction of interference from a second strongest DL transmission on a second interfering cell, when any, and so on until DL interference with larger received power than an UL transmission at the receiver of the first cell is cancelled and a detection reliability of the UL transmission can be achieved.

Figure 26:
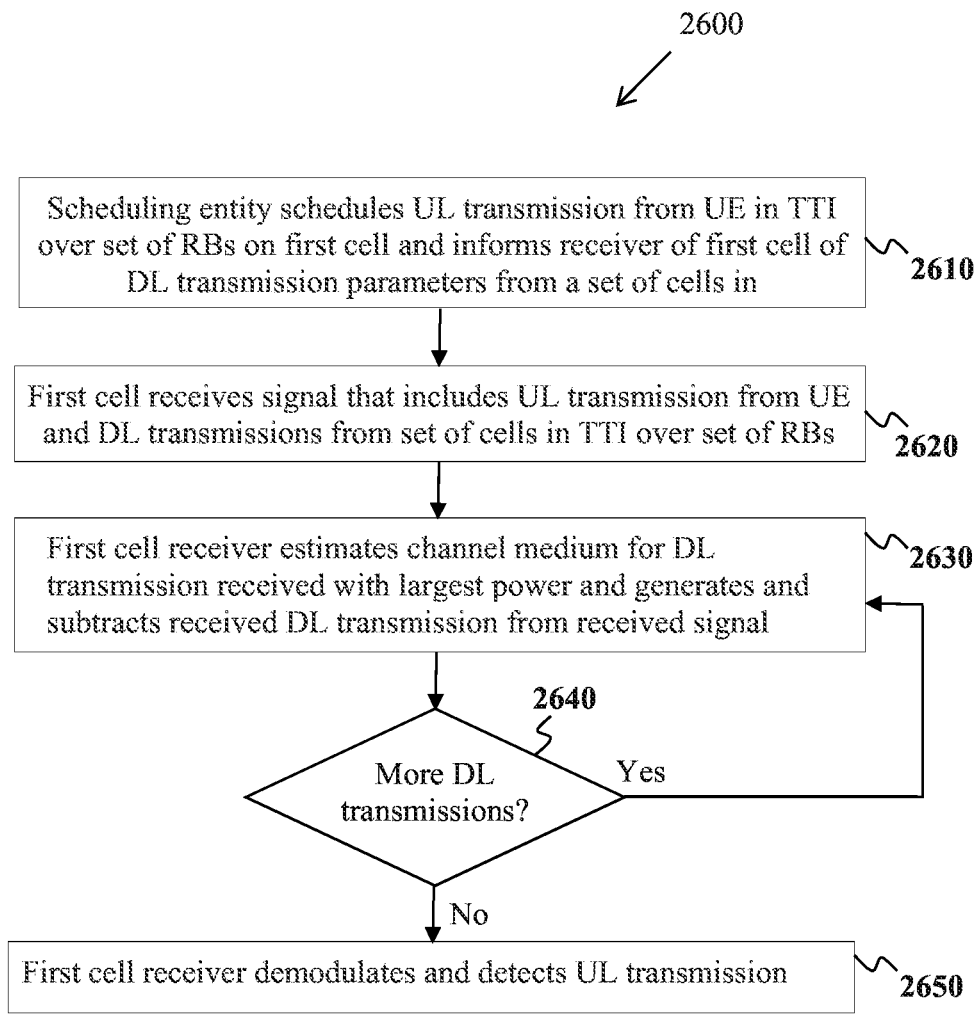
FIG. 26 illustrates an example reception method for an UL transmission interfered from DL transmissions at a receiver of a first cell according to embodiments of the present disclosure.

FIG. 26 illustrates an example reception method 2600 for an UL transmission interfered from DL transmissions at a receiver of a first cell according to embodiments of the present disclosure. An embodiment of the reception method 2600 for an UL transmission interfered from DL transmissions at a receiver of a first cell shown in FIG. 26 is for illustration only. Other embodiments may be used without departing from the scope of the present disclosure.

In step 2610, a scheduling entity schedules an UL transmission from a UE in a slot over a set of RBs on a first cell and informs a receiver of the first cell of DL transmission parameters on a set of cells in the slot and over the set of RBs. The DL transmission parameters can include MCS, precoding, RBs, and DMRS for DL transmissions on the set of cells in the slot, resources of CSI-RS transmissions, when any, as well as slot symbols when DL transmissions are not over all slot symbols. In step 2620, the receiver of the first cell receives the UL transmission from the UE and the DL transmissions from the set of cells in the slot over the set of RBs. The receiver of the first cell estimates a channel medium for DL transmission in the slot over the set of RBs that is received with a largest power and based on the estimated channel medium and on the informed DL transmission parameters, the receiver of the first cell generates the received DL transmission and subtracts a resulting signal from the received signal in step 2630. For example, the generation of the received DL transmissions can include a demodulation and detection for data or control information based on the estimated channel medium, a DMRS generation based on the channel medium, an encoding, modulation, and rate matching for the data or control information, and a scaling by the channel medium.

For example, when a DL transmission uses spatial multiplexing, the receiver can be a minimum mean square error (MMSE)—interference rejection combining (IRC) receiver followed by a serial interference cancellation (SIC) receiver; otherwise, the receiver can be a SIC receiver. In step 2640, the receiver at the first cell subsequently determines whether or not there are additional DL transmissions with received power that is larger than an expected received power for the UL transmission. When there are, the receiver at the first cell repeats step 2630; otherwise, the receiver at the first cell, in step 2650, demodulates and detects the UL transmission from the UE.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) comprising:
a transceiver configured to:
receive configuration information for a location of a channel state information (CSI) report trigger field in a downlink control information (DCI) format that includes multiple CSI report trigger fields; and
receive the DCI format; and
a controller configured to determine whether or not a value for the CSI report trigger field indicates a transmission of a CSI report,
wherein the transceiver is further configured to transmit a physical uplink control channel (PUCCH) that includes the CSI report when the value indicates a transmission of the CSI report.

2. The UE of claim 1, wherein the transceiver is further configured to receive configuration information for a PUCCH resource field, a resource for the PUCCH transmission being determined based on a value of the PUCCH resource field and a number of values of CSI report trigger fields, with respective locations prior to the location, that indicate transmissions of respective CSI reports.

3. The UE of claim 1, wherein:
the DCI format includes a PUCCH resource field; and
a resource for the PUCCH transmission is determined based on a value of the PUCCH resource field and a number of values of CSI report trigger fields, with respective locations prior to the location, that indicate transmissions of respective CSI reports.

4. The UE of claim 1, wherein:
the DCI format includes a transmission power control (TPC) command field; and
a PUCCH transmission power is determined according to a value of the TPC command field.

5. The UE of claim 1, wherein:
the DCI format indicates a reception of a channel state information reference signal (CSI-RS); and
the CSI report is determined based on the CSI-RS.

6. The UE of claim 1, wherein:
the PUCCH transmission includes a transmission of a demodulation reference signal (DMRS); and
a DMRS structure is determined based on a coding rate of the CSI report.

7. The UE of claim 1, wherein:
the PUCCH transmission is performed over a number of slots and includes a transmission of a demodulation reference signal (DMRS) over a number of sub-carriers; and
a ratio of the number of sub-carriers over the number of slots is smaller when the number of slots is larger than one than when the number of slots is one.

8. The UE of claim 1, wherein the controller is configured to identify the CSI report trigger field in the DCI format for the UE from among the multiple CSI report trigger fields in the DCI format based on the location indicated in the received configuration information.

9. A base station comprising:
a transceiver configured to:
transmit configuration information for a location of a channel state information (CSI) report trigger field in a downlink control information (DCI) format that includes multiple CSI report trigger fields, and the DCI format; and
receive a physical uplink control channel (PUCCH) that includes a CSI report when a value for the CSI report trigger field indicates a transmission of the CSI report.

10. The base station of claim 9, wherein the transceiver is further configured to transmit configuration information for a PUCCH resource field, a resource for the PUCCH reception being determined based on a value of the PUCCH resource field and a number of values of CSI report trigger fields, with respective locations prior to the location, that indicate receptions of respective CSI reports.

11. The base station of claim 9, wherein the DCI format includes a transmission power control (TPC) command field.

12. The base station of claim 9, wherein the DCI format indicates a transmission of a channel state information reference signal (CSI-RS).

13. The base station of claim 9, wherein:
the PUCCH reception includes a reception of a demodulation reference signal (DMRS); and
a DMRS structure is determined based on a coding rate of the CSI report.

14. The base station of claim 9, wherein:
the PUCCH reception includes a reception of a first demodulation reference signal (DMRS) and a second DMRS that is frequency division multiplexed with the first DMRS over a common bandwidth on a same reception symbol; and wherein the transceiver is further configured to demodulate, using the second DMRS, a signal received on same sub-carriers as the CSI report.

15. A method for a user equipment (UE) to transmit a CSI report, the method comprising:
receiving configuration information for a location of a channel state information (CSI) report trigger field in a downlink control information (DCI) format that includes multiple CSI report trigger fields;
receiving the DCI format;
determining whether or not a value for the CSI report trigger field indicates a transmission of a CSI report; and
transmitting a physical uplink control channel (PUCCH) that includes the CSI report when the value indicates a transmission of the CSI report.

16. The method of claim 15, further comprising receiving configuration information for a PUCCH resource field, a resource for the PUCCH transmission being determined based on a value of the PUCCH resource field and a number of values of CSI report trigger fields, with respective locations prior to the location, that indicate transmissions of respective CSI reports.

17. The method of claim 15, wherein:
the DCI format includes a PUCCH resource field; and
a resource for the PUCCH transmission is determined based on a value of the PUCCH resource field and a number of values of CSI report trigger fields, with respective locations prior to the location, that indicate transmissions of respective CSI reports.

18. The method of claim 15, wherein:
the DCI format includes a transmission power control (TPC) command field; and
a PUCCH transmission power is determined according to a value of the TPC command field.

19. The method of claim 15, wherein:
the DCI format indicates a reception of a channel state information reference signal (CSI-RS); and
the CSI report is determined based on the CSI-RS.

20. The method of claim 15, wherein:
the PUCCH transmission includes a transmission of a demodulation reference signal (DMRS); and
a DMRS structure is determined based on a coding rate of the CSI report.

21. The method of claim 15, wherein:
the PUCCH transmission is performed over a number of slots and includes a transmission of a demodulation reference signal (DMRS) over a number of sub-carriers; and
a ratio of the number of sub-carriers over the number of slots is smaller when the number of slots is larger than one than when the number of slots is one.

* * * * *